(12) United States Patent
Hung et al.

(10) Patent No.: US 10,393,584 B2
(45) Date of Patent: Aug. 27, 2019

(54) SPECTROMETER, MONOCHROMATOR, DIFFRACTION GRATING AND METHODS OF MANUFACTURING GRATING AND MOLD

(71) Applicant: OtO Photonics Inc., Hsinchu (TW)

(72) Inventors: Chien Hsiang Hung, Hsinchu (TW); Jan Liang Yeh, Hsinchu (TW)

(73) Assignee: OTO PHOTONICS INC., Hsinchu (TW)

( * ) Notice: Subject to any disclaimer, the term of this patent is extended or adjusted under 35 U.S.C. 154(b) by 129 days.

(21) Appl. No.: 14/834,436

(22) Filed: Aug. 25, 2015

(65) Prior Publication Data

US 2016/0349111 A1 Dec. 1, 2016

Related U.S. Application Data

(63) Continuation-in-part of application No. 13/696,613, filed on Mar. 14, 2013, now Pat. No. 9,372,290, and
(Continued)

(51) Int. Cl.
| | |
|---|---|
| *G01J 3/02* | (2006.01) |
| *G01J 3/18* | (2006.01) |
| *G02B 5/18* | (2006.01) |
| *B26D 3/06* | (2006.01) |
| *B29D 11/00* | (2006.01) |
| *B29C 33/38* | (2006.01) |
| *B29L 31/00* | (2006.01) |
| *B29L 11/00* | (2006.01) |

(52) U.S. Cl.
CPC ............ *G01J 3/18* (2013.01); *B26D 3/06* (2013.01); *B29C 33/3842* (2013.01); *B29D 11/00769* (2013.01); *G01J 3/0208* (2013.01); *G02B 5/1828* (2013.01); *G02B 5/1852* (2013.01); *G02B 5/1857* (2013.01); *G02B 5/1861* (2013.01); *B29L 2011/00* (2013.01); *B29L 2031/757* (2013.01)

(58) Field of Classification Search
CPC .. B26D 3/06; G01J 3/0208; G01J 3/18; B29C 33/3842; B29D 11/00769; G02B 5/1828
USPC ........................................ 356/326–328, 317
See application file for complete search history.

(56) References Cited

U.S. PATENT DOCUMENTS

| | | | | |
|---|---|---|---|---|
| 5,052,766 | A | * | 10/1991 | Noda .................. G02B 5/1857 359/15 |
| 5,550,375 | A | * | 8/1996 | Peters ...................... G01J 3/02 250/343 |

(Continued)

*Primary Examiner* — Isiaka O Akanbi
(74) *Attorney, Agent, or Firm* — Cheng-Ju Chiang

(57) ABSTRACT

A diffraction grating comprise a substrate and a plurality of connected diffraction structures formed on the substrate. Each diffraction structure is in the shape of a column and arranged along a concave cylindrical surface, and an axis of each diffraction structure extends along a generatrix of the concave cylindrical surface. A section contour is obtained by a cross section of the diffraction structures. The cross section is perpendicular to each axis of the diffraction structure. The section contour shows the connecting line of apexes of the diffraction structures as a reference curve having a plurality of first inflection points, wherein the diffraction structures are configured for separating the optical signal into a plurality of spectral components and focusing the spectral components onto a focal surface.

22 Claims, 30 Drawing Sheets

Related U.S. Application Data a continuation-in-part of application No. 12/966,083, filed on Dec. 13, 2010, now Pat. No. 9,146,155, which is a continuation-in-part of application No. 12/180,567, filed on Jul. 28, 2008, now abandoned, which is a continuation-in-part of application No. 12/045,836, filed on Mar. 11, 2008, now abandoned, application No. 14/834,436, which is a continuation-in-part of application No. 13/656,028, filed on Oct. 19, 2012.

(56) References Cited

U.S. PATENT DOCUMENTS

| | | | |
|---|---|---|---|
| 9,146,155 B2 * | 9/2015 | Ko | G01J 3/02 |
| 2003/0016355 A1 * | 1/2003 | Koike | G01J 3/18 |
| | | | 356/328 |
| 2010/0165468 A1 * | 7/2010 | Yamada | G02B 1/118 |
| | | | 359/613 |
| 2012/0299138 A1 * | 11/2012 | Rauker | G02B 7/004 |
| | | | 257/432 |
| 2013/0170043 A1 * | 7/2013 | Ko | G02B 5/1809 |
| | | | 359/571 |
| 2013/0342909 A1 * | 12/2013 | Sukegawa | G02B 1/02 |
| | | | 359/571 |
| 2014/0092384 A1 * | 4/2014 | Ebata | G03F 1/54 |
| | | | 356/319 |
| 2016/0259098 A1 * | 9/2016 | Sasai | G02B 5/1852 |

* cited by examiner

SPECTROMETER, MONOCHROMATOR, DIFFRACTION GRATING AND METHODS OF MANUFACTURING GRATING AND MOLD

This application is a continuation-in-part application of application Ser. No. 13/696,613 (filed on May 7, 2010), application Ser. No. 12/966,083 (filed on Dec. 13, 2010), and application Ser. No. 13/656,028 (filed on Oct. 19, 2012), in which the application Ser. No. 12/966,083 is a continuation-in-part application of application Ser. No. 12/045,836 (filed on Mar. 11, 2008, now abandoned) and Ser. No. 12/180,567 (filed on Jul. 28, 2008, now abandoned). The above-identified patent application are hereby incorporated by reference in its entirety.

BACKGROUND OF THE INVENTION

1. Field of the Invention

The present application generally relates to an optical measurement device, an optical component thereof, and methods of manufacturing the optical component and a mold for replicating the optical component; and more specifically to a spectrometer, a monochromator, a diffraction grating, and methods of manufacturing the diffraction grating and a mold for replicating the diffraction grating.

2. Description of Related Art

A spectrometer is a non-destructive testing instrument, which recognizes the ingredients and the properties of a substance according to atomic or molecular energy levels and chemical bonds of the substance. According to the reflection theory of the light, the compositional structures of substances are different from each other in terms of reflection, absorption and transmittance for the light with different frequency bands, and different substances have their respective spectrum arranged according to the wavelength.

Referring to FIG. 1, a conventional spectrometer 100 is shown. After the light 10 generated by the light source 110 is emitted to the spectrometer 100 via the slit 120, the light 10 is emitted to a collimating mirror 130 and thus converted to a parallel light which is then emitted to a plane grating 140 having a plurality of diffraction structures 142. The light 10 dispersed by the diffraction structures 142 of the grating 140 is focused by the focusing mirror 150 and emitted to the optical sensor 160 to measure the intensity of the light with different wavelengths. However, the conventional spectrometer 100 uses a plane grating 140, which requires the collimating mirror 130 and a focusing mirror 150 for accurately dispersing and focusing the light. Thus, the spectrometer 100 needs more optical components so that the configuration of the spectrometer 100 is complicated, and it is difficult to miniaturize the spectrometer 100.

SUMMARY OF THE INVENTION

The present disclosure is directed to a diffraction grating which can disperse and focus light.

The present disclosure is directed to a method of manufacturing the diffraction grating.

The present disclosure is directed to a spectrometer including the diffraction grating.

The present disclosure is directed to a monochromator including the diffraction grating.

The present disclosure is directed to a method of manufacturing a mold that is used for replicating the diffraction grating.

According to an embodiment of the present disclosure, a method of manufacturing a diffraction grating comprising the following steps. Provide a substrate, wherein the substrate has a concave cylindrical surface. Then, form a plurality of connected diffraction structures on the concave cylindrical surface. Each diffraction structure is in the shape of a column, and an axis of each diffraction structure extends along a generatrix of the concave cylindrical surface, wherein a section contour is obtained by a cross section of the diffraction structures. The cross section is perpendicular to each axis of the diffraction structure. The section contour shows the connecting line of apexes of the diffraction structures as a reference curve having a plurality of first inflection points.

According to an embodiment of the present disclosure, a diffraction grating comprise a substrate and a plurality of connected diffraction structures formed on the substrate. Each diffraction structure is in the shape of a column and arranged along a concave cylindrical surface, and an axis of each diffraction structure extends along a generatrix of the concave cylindrical surface. A section contour is obtained by a cross section of the diffraction structures. The cross section is perpendicular to each axis of the diffraction structure. The section contour shows the connecting line of apexes of the diffraction structures as a reference curve having a plurality of first inflection points, wherein the diffraction structures are configured for separating the optical signal into a plurality of spectral components and focusing the spectral components onto a focal surface.

BRIEF DESCRIPTION OF THE DRAWINGS

The disclosure is illustrated by way of example, and not by way of limitation, in the figures of the accompanying drawings in which like reference numerals refer to similar elements and in which.

DETAILED DESCRIPTION OF THE PREFERRED EMBODIMENTS

A spectrometer, a monochromator, a diffraction grating, and methods of manufacturing the diffraction grating and a mold for replicating the diffraction gratin are disclosed. In the following description, for purposes of explanation, numerous specific details are set forth in order to provide a thorough understanding of the embodiment of the disclosure. It is apparent, however, to one skilled in the art that the present disclosure may be practiced without these specific details or with an equivalent arrangement.

Figure 1:
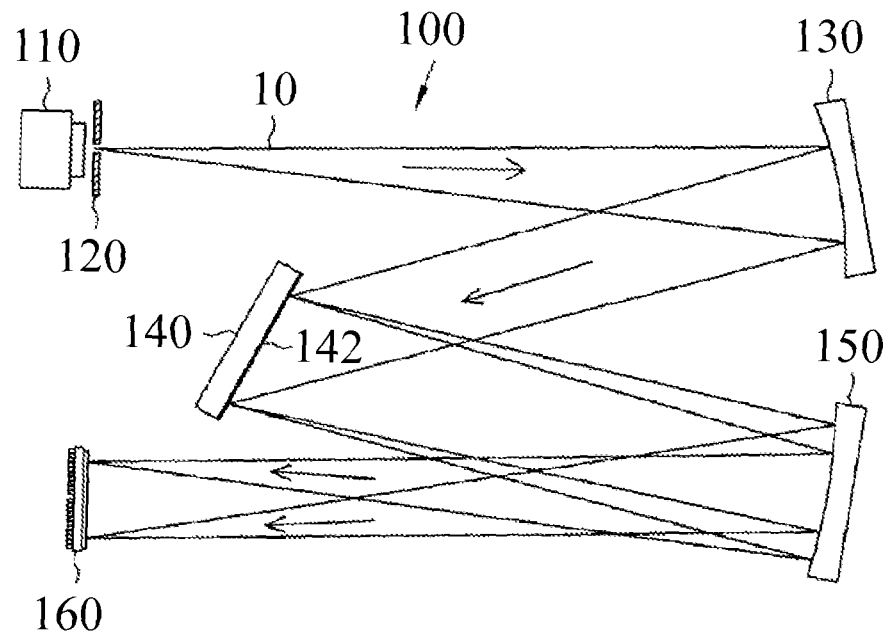
FIG. 1 is an exemplary diagram of a conventional spectrometer.
Figure 2A:
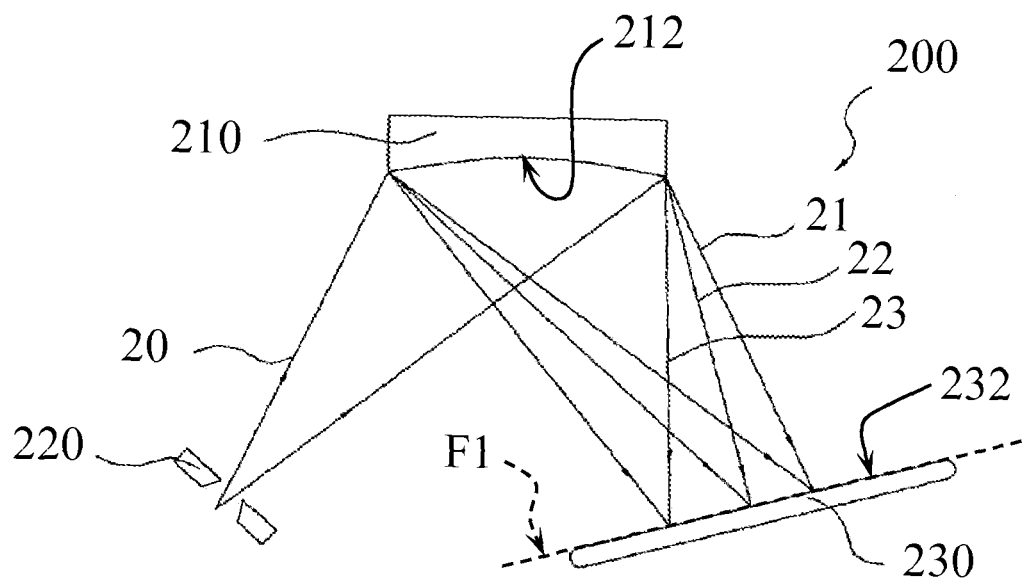
FIG. 2A is an exemplary diagram of optical paths for a spectrometer in accordance with an embodiment of the present disclosure.

FIG. 2A is an exemplary diagram of optical paths for a spectrometer in accordance with an embodiment of the present disclosure. Referring to FIG. 2A, the spectrometer 200 includes a diffraction gating 210, an input member 220, and an optical sensor 230. The input member 220 can receive an optical signal 20, and the wavelength of the optical signal 20 is in a range between infrared (IR) and ultraviolet (UV). The input member 220, as shown in FIG. 2A, may be a slit. However, the input member 220 can be an end of an optical fiber or made of an optical fiber. For example, the input member 220 may be made of a fiber core. Moreover, the input member 220 can be an assembly including the slit and the optical fiber.

The diffraction gating 210 has a diffraction surface 212 that is capable of separating the optical signal 20 into a plurality of spectral components 21, 22, and 23. Spectral components 21, 22, and 23 have different wavelengths. In this embodiment, the diffraction gating 210 may be a reflective diffraction grating. Hence, the diffraction surface 212 not only separates the optical signal 20 into the spectral components 21, 22, and 23, but also reflects the spectral components 21, 22, and 23 to an optical receiving surface 232 of the optical sensor 230. However, it is noted that the diffraction gating 210 is not limited to the reflective diffraction grating. In another embodiment, the diffraction gating 210 may be a transmission diffraction grating.

The diffraction surface 212 is concave so that the diffraction surface 212 can focus the spectral components 21, 22, and 23 onto the focal surface F1. The focal surface F1 may be a flat surface, a curved surface or a freeform surface. The optical receiving surface 232 may be a flat surface or a curved surface. In this embodiment, the optical receiving surface 232 is a flat surface and arranged in the focal surface F1. In other words, the optical receiving surface 232 and the focal surface F1 are substantially coplanar. When the spectral components 21, 22, and 23 converge onto the optical receiving surface 232 (it also means onto the focal surface F1), the spectral components 21, 22, and 23 are arranged in a linear distribution, and the spectral components 21, 22, and 23 presented on the optical receiving surface 232 have FWHM (Full Width at Half Maximum) smaller than or equal to the wavelength resolution of the optical sensor 230 corresponded to the spectral components 21, 22, and 23.

The optical sensor 230 may be a Linear Optical Sensor Arrays (LSAs) such as a photodiode array, Charge-Coupled Device (CCD) or Complementary Metal-Oxide-Semiconductor (CMOS) image sensor. The optical sensor 230 can receive the spectral components 21, 22, and 23 from the optical receiving surface 232, and measure the optical parameters such as the luminous intensity or radiant intensity.

Figure 2B:
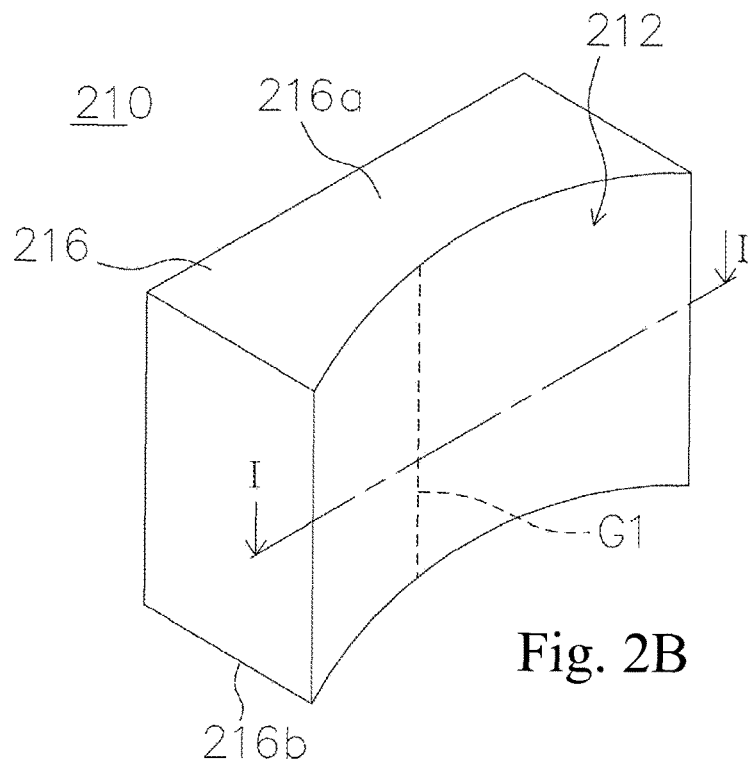
FIG. 2B is a perspective view of the diffraction gating illustrated in FIG. 2A.
Figure 2C:
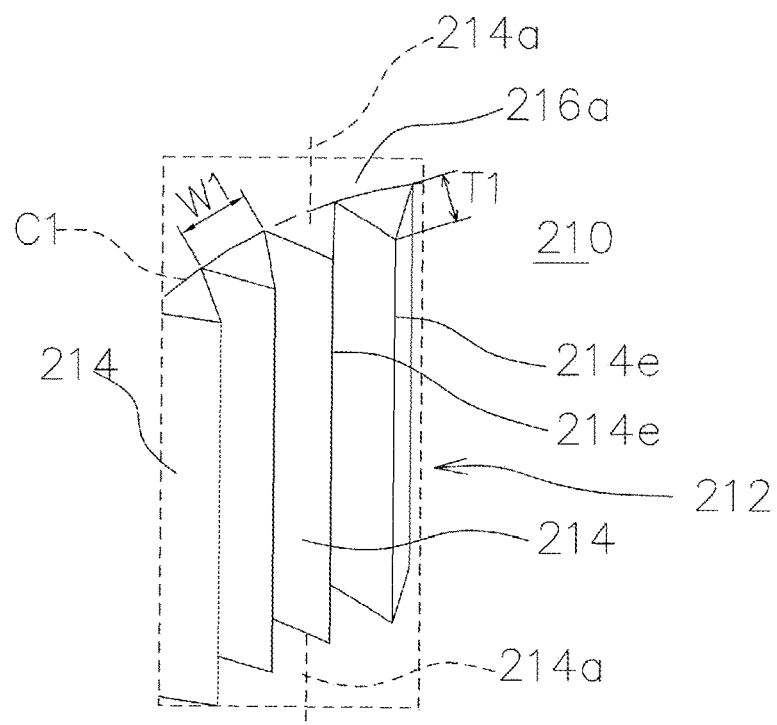
FIG. 2C is a partially enlarged view of the diffraction surface illustrated in FIG. 2B.

FIG. 2B is a perspective view of the diffraction gating illustrated in FIG. 2A, and FIG. 2C is a partially enlarged view of the diffraction surface illustrated in FIG. 2B. Referring to FIGS. 2B and 2C, the diffraction grating 210 includes a plurality of connected diffraction structures 214 and a substrate 216. The substrate 216 has a first side surface 216a and a second side surface 216b. The first side surface 216a is opposite to the second side surface 216b. As illustrated in FIG. 2B, the first side surface 216a is an upper surface of the diffraction grating 210, and the second side surface 216b is a lower surface of the diffraction grating 210. The diffraction structures 214 is formed on the substrate 216 and between the first side surface 216a and the second side surface 216b.

Each of the diffraction structures 214 is formed in the shape of a column. As an embodiment shown in FIG. 2C, the shape of each diffraction structure 214 is a prism such as a triangular prism, and thus each diffraction structure 214 has a lateral edge 214e. The connected diffraction structures 214 are arranged along the concave cylindrical surface C1, and the axes 214a of the diffraction structures 214 extend along a generator G1. That is, the extension directions of the lateral edges 214e and the generator G1 are the same.

According to the basic geometry, the concave cylindrical surface C1 is formed by moving the generator G1 parallel to itself along a directrix. Since the directrix is parallel to the concave cylindrical surface C1, the directrix is a curve. Further, in FIG. 2C, the diffraction structures 214 are elongated from the first side surface 216a to the second side surface 216b. The first side surface 216a and the second side surface 216b connect to the two ends of the diffraction structures 214 respectively, as shown in FIG. 2B. Thus, the diffraction surface 212 extends from the first side surface 216a to the second side surface 216b so that the diffraction grating 210 can have larger diffraction surface 212, thereby increasing the sensitivity of the spectrometer 200.

The width W1 of each diffraction structure 214 is within 10 micrometer, and the thickness T1 of the diffraction structure 214 is within 1 micrometer. For example, the width W1 may be in a range of 3 to 4 micrometers, whereas the thickness T1 may be in a range of 0.4 to 0.6 micrometers. Accordingly, the size of each diffraction structure 214 is close to the wavelength of the light beam, such as IR, UV or visible light, so that the diffraction structure 214 can diffract and disperse the optical signal 20 into the spectral components 21, 22, and 23.

The radius of curvature of the concave cylindrical surface C1 may be smaller than 10 millimeter (mm). The width W1 of each diffraction structure 214 is within in 10 micrometer, and the thickness T1 is larger than 0.3 micrometers. Thus, the basic profile of the diffraction surface 212 is almost the same to the concave cylindrical surface C1. Further, the concave cylindrical surface C1 may be a second degree or higher polynomial curve, which can be a quadratic surface, such as circular cylindrical surface, elliptic cylindrical surface, hyperbolic cylindrical surface or parabolic cylindrical surface. Therefore, the concave cylindrical surface C1 may not have any inflection point.

Figure 2D:
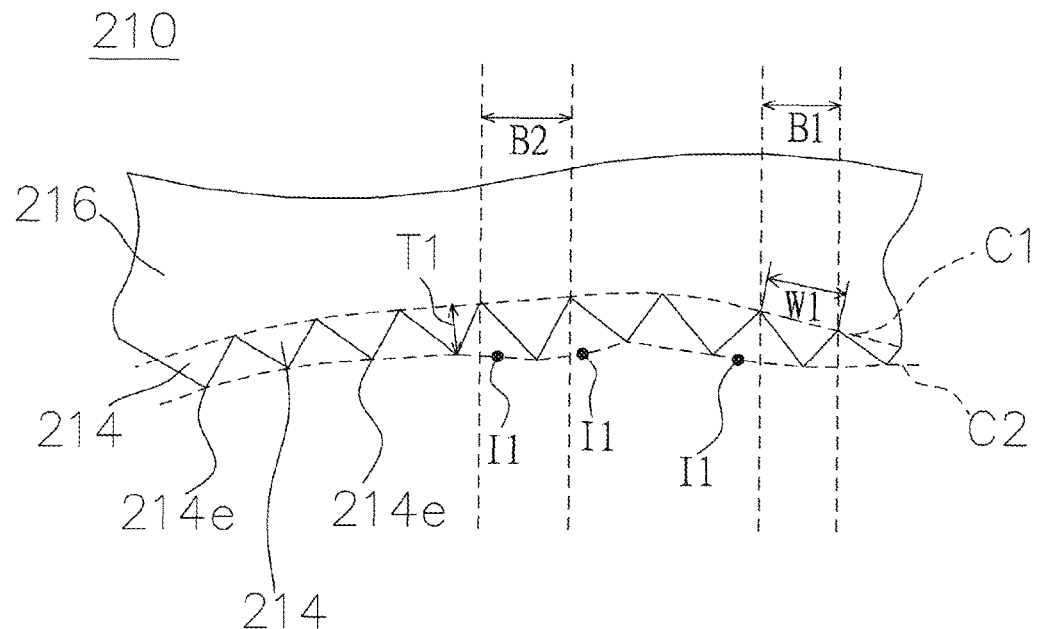
FIG. 2D is a cross-sectional view of the diffraction gating taken along the line I-I in FIG. 2B.

FIG. 2D is a cross-sectional view of the diffraction gating taken along the line I-I in FIG. 2B. Referring to FIG. 2D, the diffraction grating 210 as shown in FIG. 2D is a section contour which is obtained by a cross section of the diffraction gratings 210, in which the cross section is perpendicular to each axis 214a. Each of apexes of the diffraction structures 214 shown in the section contour of FIG. 2D is the lateral edge 214e. The connecting line of apexes of the diffraction structures 214 (i.e., the lateral edge 214e) is a reference curve C2. Each lateral edge 214e is placed at the reference curve C2. Moreover, the reference curve C2 has a plurality of first inflection points I1, and can be a fourth degree or higher polynomial curve or a freeform surface.

The reference curve C2 is a virtual curve obtained by mathematical analysis based on the locations of apexes (i.e., the lateral edge 214e). The mathematical analysis may be a group consisting of curve fitting and regression analysis. For example, the mathematical analysis can include both curve fitting and regression analysis. Moreover, the mathematical analyses can be implemented by computer software, which is purchased from the market or downloaded from the internet.

Accordingly, those diffraction structures 214 are arranged along the concave cylindrical surface C1 and reference curve C2 with a plurality of first inflection points I1, which makes the diffraction grating 210 not only diffract the optical signal 20, but also focus the spectral components 21, 22, and 23 onto the focal surface F1 (referring to FIG. 2A). Further, the diffraction structures 214 may have different pitches. FIG. 2D shows one example that at least two pitches B1, B2 of two adjacent diffraction structures 214 have two different distances. Such distances (e.g. distance of two pitches B1, B2) may influence the convergence of the spectral components 21, 22, and 23. Therefore, by giving a plurality of different pitch arrangements for each two adjacent diffraction structures 214. The diffraction structures 214 arranged along the concave cylindrical surface C1 is able to change the shape of the focal surface F1 which satisfies different kind of the optical receiving surface 232.

Figure 3:
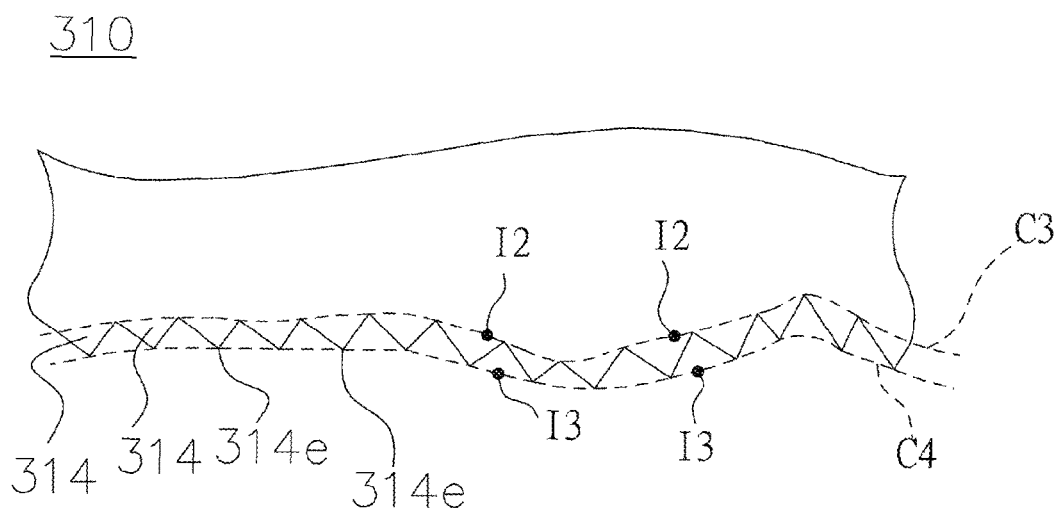
FIG. 3 is a cross-sectional view of an diffraction gating in accordance with another embodiment of the present disclosure.

FIG. 3 is a cross-sectional view of an diffraction gating in accordance with another embodiment of the present disclosure The diffraction grating 310 illustrated in FIG. 3 compared to the above-mentioned diffraction grating 210 has some similarities. For example, diffraction structures 314 in the diffraction grating 310 is also arranged along the concave cylindrical surface C3, and the lateral edge 314e of each two adjacent diffraction structures 314 lines a reference curve C4. The reference curve C4 has a first inflection points I3.

However, the substantial different is that the concave cylindrical surface C3 is a polynomial surface with at least four degrees, and thus the concave cylindrical surface C3 has at least one second inflection point I2. In this embodiment shown in FIG. 3, the concave cylindrical surface C3 has at least two second inflection point I2.

It is noted that although the shapes of the aforementioned diffraction structures 214, 314 are the triangular prism, the shape of the diffraction structures 214, 314 can be prism other than triangular prism such as trapezoid prism or pentagonal prism. Also the shapes of the diffraction structures of the diffraction gratings 410a, 410b, 410c, 410d may be various column shapes illustrated in FIGS. 4A to 4D.

Figure 4A:
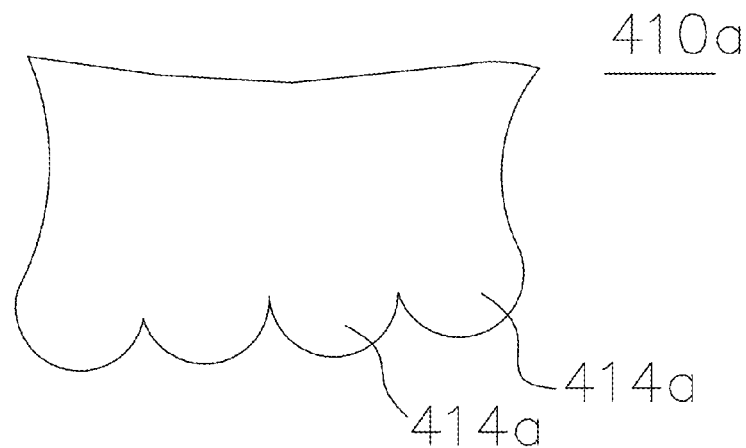
FIGS. 4A to 4D are cross-sectional views of the diffraction gratings in accordance embodiments of the present disclosure.
Figure 4B:
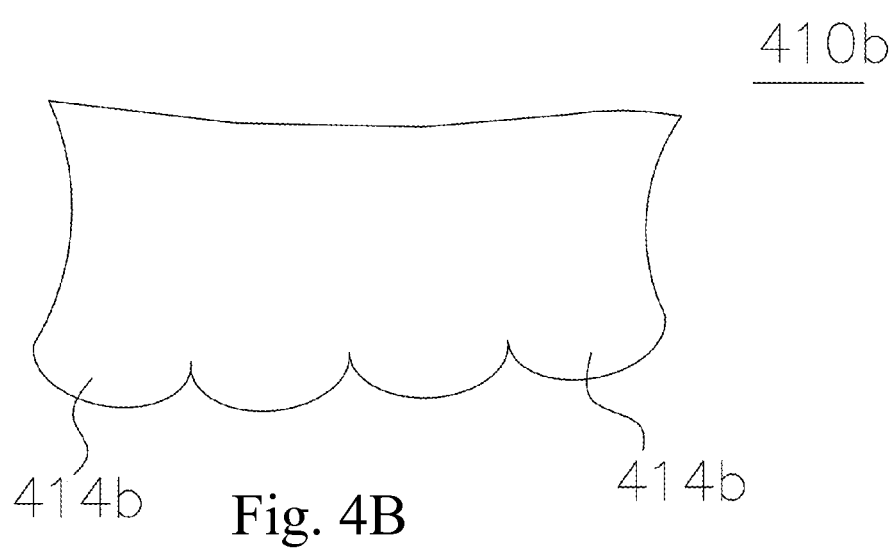
Figure 4C:
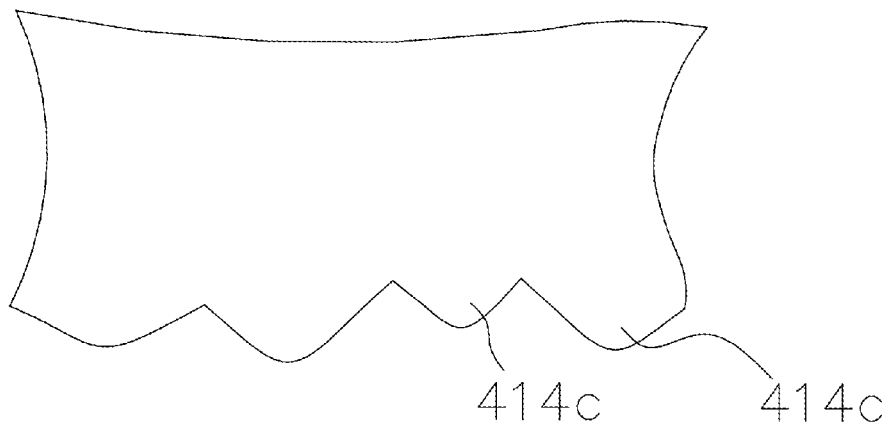
Figure 4D:
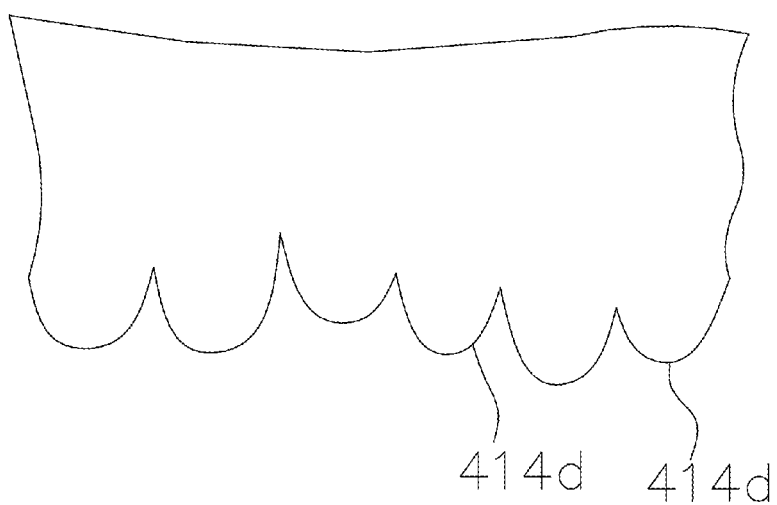

The diffraction structures 414a illustrated in FIG. 4A is in a shape of semi-circular cylinder, the diffraction structures 414b illustrated in FIG. 4B is in a shape of semi-elliptical cylinder, the diffraction structures 414c illustrated in FIG. 4C is in a shape of hyperbolic cylinder and the diffraction structures 414d illustrated in FIG. 4D is in a shape of parabolic cylinder. The shapes of semi-circular cylinder, semi-elliptical cylinder, hyperbolic cylinder and parabolic cylinder can be implemented to the aforementioned diffraction structures 214, 314, which are not limited to prism or triangular prism.

Figure 5:
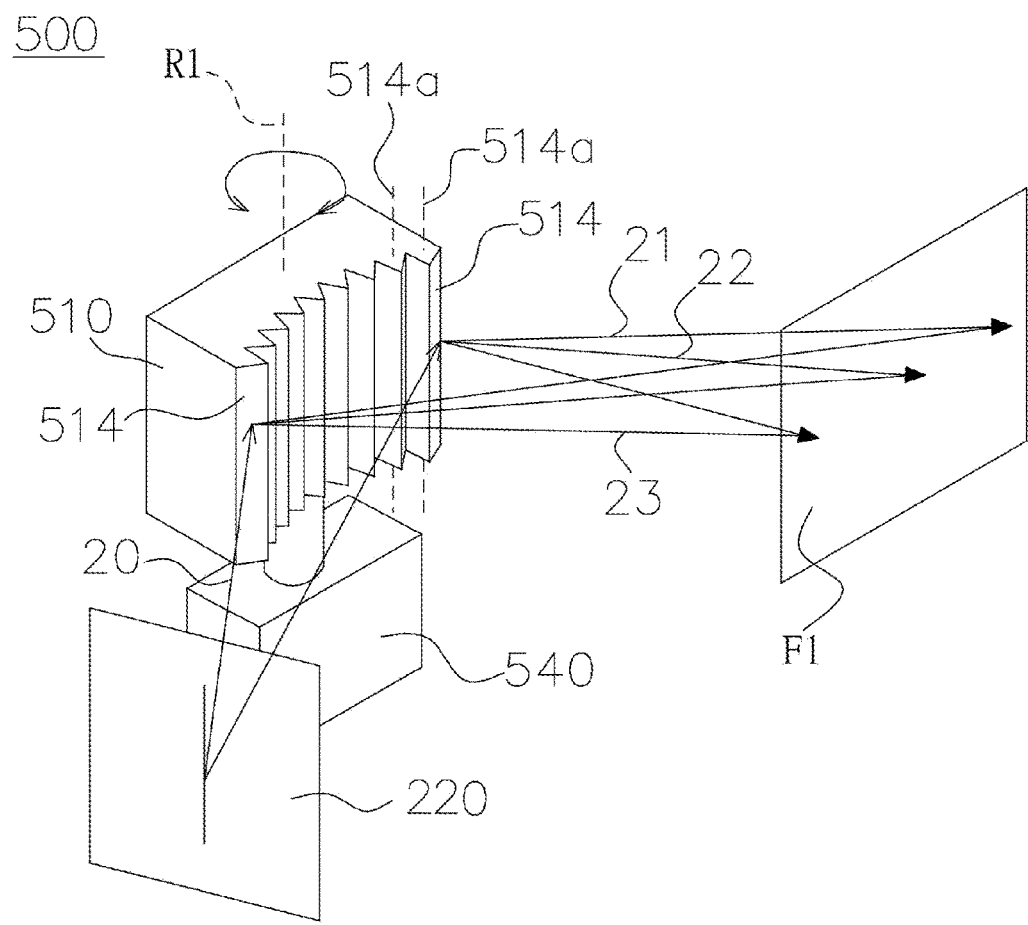
FIG. 5 is an exemplary diagram of optical paths of a monochromator in accordance with an embodiment of the present disclosure.

All the diffraction gratings above disclosed can be employed in a spectrometer or a monochromator. FIG. 5 is an exemplary diagram of optical paths of a monochromator in accordance with an embodiment of the present disclosure. The monochromator 500 comprises an input member 220, a diffraction grating 510 and a rotating mechanism 540. The diffraction grating 510 can be implemented using aforementioned diffraction grating 210, 310, 410a, 410b, 410c, 410d, or the transmission diffraction grating. The diffraction structures 514 is able to disperse an optical signal 20 received from the input member 220 and to focus the spectral components 21, 22, and 23 onto a focal surface F1.

Different from the abovementioned spectrometer 200, the diffraction grating 510 of the monochromator 500 is connected to the rotating mechanism 540. The rotating mechanism 540 rotates the diffraction grating 510 corresponding to the input member 220 along an rotating axis R1. The rotating axis R1 is parallel to axes 514a of the diffraction structures 514. The rotating mechanism 540 may comprises a motor and an operator assembly (not shown) coupled together. The operator assembly may comprise a pulley set and a plurality of wheels.

The rotating mechanism 540 is driven by the motor through the operator assembly, which rotates the diffraction grating 510 along the rotating axis R1 for changing the incidence angle of the optical signal 20. In addition, a person skill in the art (e.g., basic mechanical design knowledge) will realize the implementation of the motor and the operator to drive the operator. For example, using at least two engaged wheels to the motor for making the rotating mechanism 540 to be rotated along the rotating axis R1. However, it is noted that the operator may not be a required component for the rotating mechanism 540. The rotating mechanism 540 can directly connects to diffraction grating 510 with the motor for rotation.

Figure 6A:
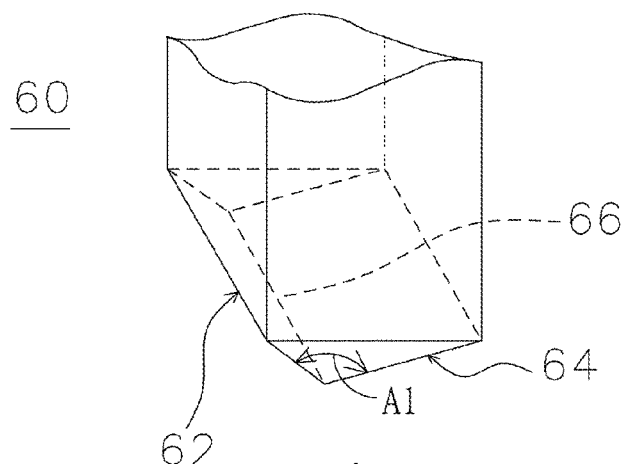
FIGS. 6A to 6E are exemplary diagrams of a manufacturing method for a diffraction grating in accordance with an embodiment of the present disclosure.

With reference to FIGS. 6A to 6E, the rulings of diffraction structures 214, 314, 414a, 414b, 414c, 414d of aforementioned embodiments can be ruled through a knife. FIG. 6A illustrates an exemplary diagram of a blade of a ruling knife. The blade 60 is adapted for a mechanical working platform (not shown) that uses a stepper motor or a piezoelectric material to move the blade 60 for ruling. The blade 60 comprises a directional face 62 and an non-directional face 64. The directional face 62 connects to the non-directional face 64. The directional face 62 is used for determining the blaze angle of the diffraction grating. An angle A1 and an edge 66 are formed between the directional face 62 and the non-directional face 64. The blade 60 may be made of a group of the high hardened material consisting of the diamond and the tungsten carbide (also known as tungsten steel).

Figure 6B:
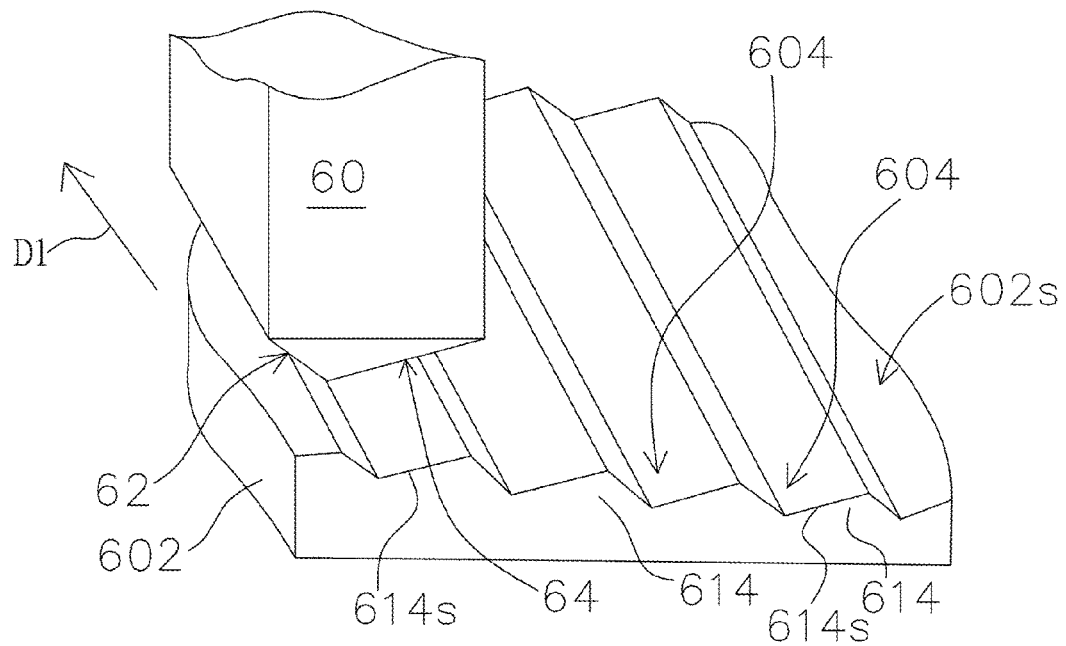

With reference to FIG. 6B, the diffraction structures are formed by ruling a plurality of grooves 604 on the concave cylindrical surface of the substrate 602 using the blade 60. The grooves 604 are latitudinal aligned. The blade 60 rules the substrate 602 in the ruling direction D1, and the ruling direction D1 is substantially parallel to the edge 66. When the blade 60 rules the concave cylindrical surface 602s, the directional face 62 and non-directional face 64 are in contact with the substrate 602.

Further, since the grooves 604 being ruled by the blade 60, each groove 604 is able to elongate to the two sides of the substrate 602, which makes the diffraction structures 614 elongated to the two sides of the substrate. Each diffraction structure 614 has a flat lateral face 614s. As also shown in FIG. 2C, the larger diffraction surface (i.e., the diffraction surface 212 of the diffraction structure 214) increases the sensitivity of the spectrometer.

Figure 6C:
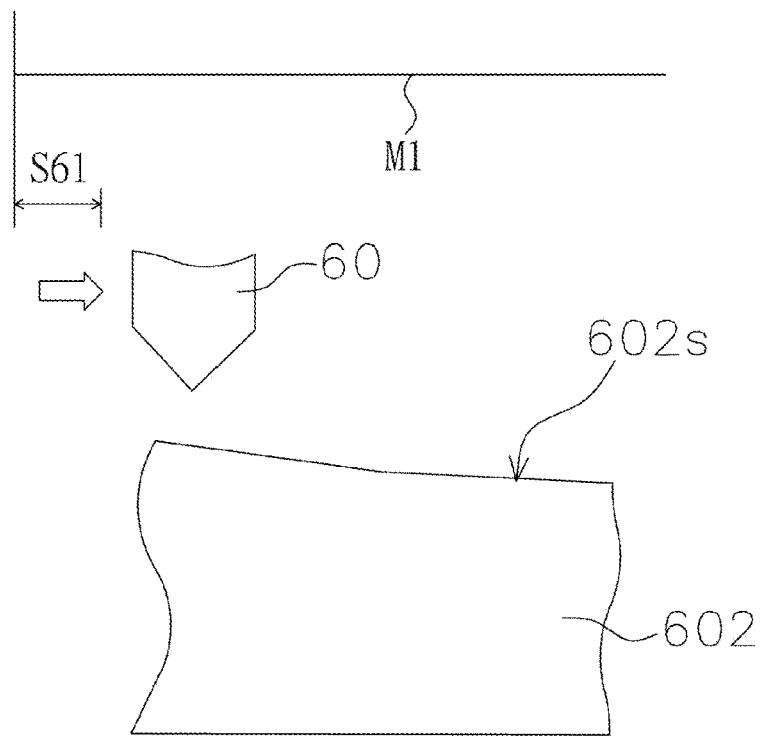
Figure 6D:
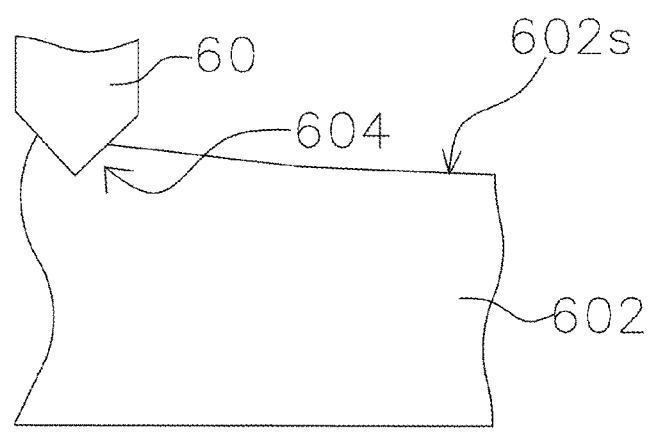
Figure 6E:
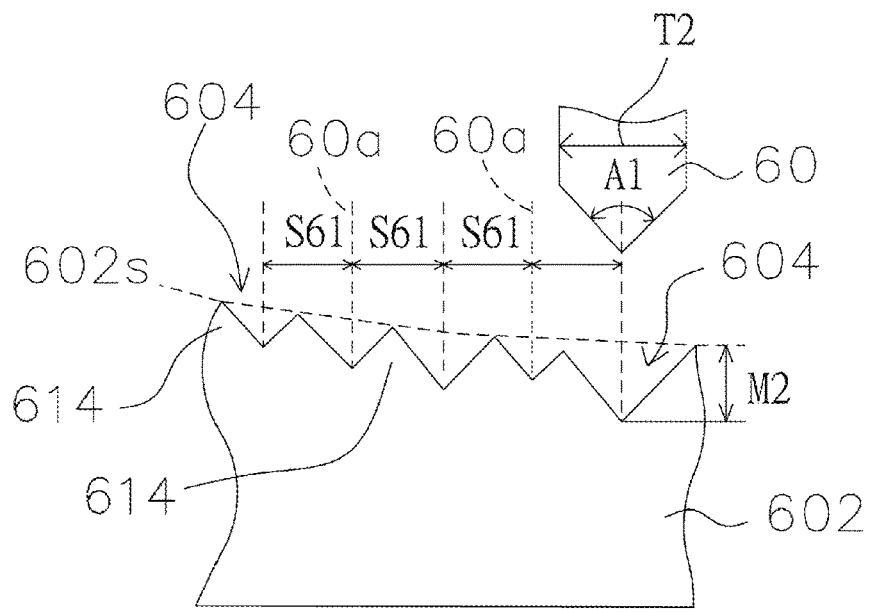

With reference to FIGS. 6C to 6E, the manufacturing method for the disclosed diffraction grating 210, 310, 410a, 410b, 410c and 410d comprises acts of providing a substrate 602, moving the blade 60 for a distance S61 along a path M1, ruling the concave cylindrical surface 602s to form one of the grooves 604, and forming the diffraction structure 614.

As shown in FIG. 6C, the substrate 602 has a concave cylindrical surface 602s. The substrate 602 may be a metal plate, a glass plate or a silicon wafer. The concave cylindrical surface 602s may be at least quadratic polynomial curved surface, and thus the concave cylindrical surface 602s have no inflection point. However, in other embodiments, the concave cylindrical surface 602s may also be fourth degree or higher polynomial curve, which the concave cylindrical surface 602s has a plurality of inflection point.

Forming a concave cylindrical surface 602s may have many ways. When the substrate 602 is a metal plate, the concave cylindrical surface 602s may obtained by using machining techniques such as stamping, polishing or blasting. When the substrate 602 is a glass plate or a silicon wafer, the concave cylindrical surface 602s can be obtained by grinding, blasting or etching.

With references FIGS. 6C and 6D, repeating the acts of moving the blade 60 for a distance S61 along a path M1, and then ruling the concave cylindrical surface 602s to form one of the grooves 604 for several times. The path M1 is not parallel to the generator of the concave cylindrical surface 602s (not shown). For example, the path M1 may be a straight line that is perpendicular to the generator, or the path M1 may be a curve that extends along the directrix of the concave cylindrical surface 602s.

With reference to FIGS. 6D and 6E, after implementing the abovementioned acts, the blade 60 will rule a plurality of grooves 604, which creates a plurality of latitudinal aligned diffraction structures 614, and reference curves C2, C4 as shown in FIG. 2D and FIG. 3. The diffraction structure 614 may be the aforementioned diffraction structure 214, 314, 414a, 414b, 414c, 414d. Each time the blade 60 rules the concave cylindrical surface 602s, the degree of depth for each cut may not be the same. Moreover, each moving distance S61 is shorten than the thickness T2 of the blade 60. As shown in FIG. 6E, each time the concave cylindrical surface 602s has been ruled, bisector planes 60a of the angles A1 are parallel to each other.

Figure 7:
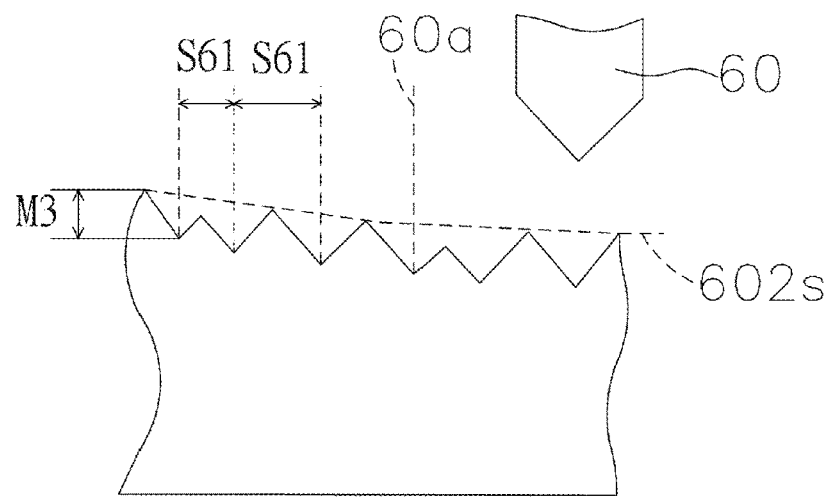
FIG. 7 is an exemplary diagram of a manufacturing method for a diffraction grating in accordance with another embodiment of the present disclosure.

Further, in this embodiment, the distances S61 for moving the blade 60 are the same, which makes the pitches of the diffraction structures 614 equal. However, in different embodiment, as shown in FIG. 7, the pitches of the diffraction structures 614 may be different for every two times of moving blade 60 of the distances S61. Furthermore, the degree of the ruling depths of the concave cylindrical surface 602s, as shown in FIG. 7, can be equal.

Figure 8A:
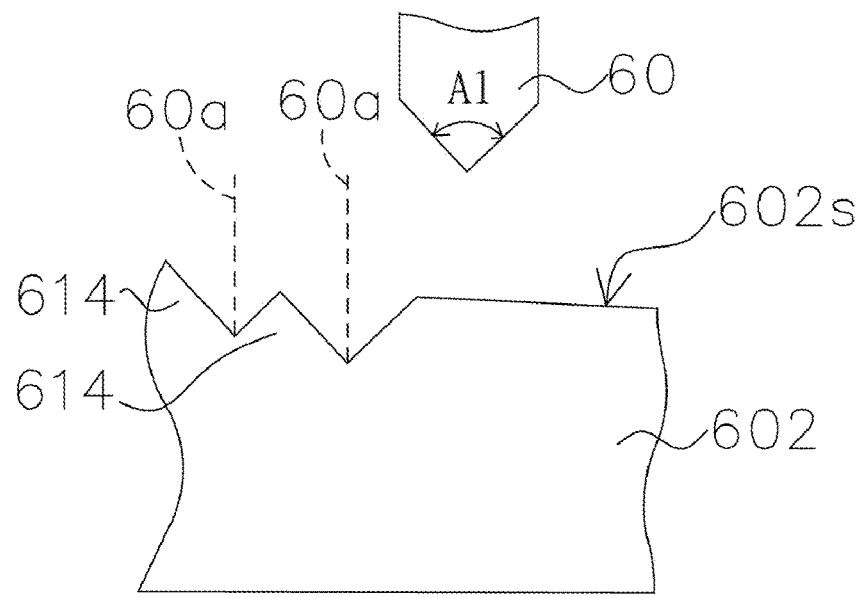
FIGS. 8A to 8D are exemplary diagrams of a manufacturing method for a diffraction grating in accordance with an embodiment of the present disclosure.
Figure 8B:
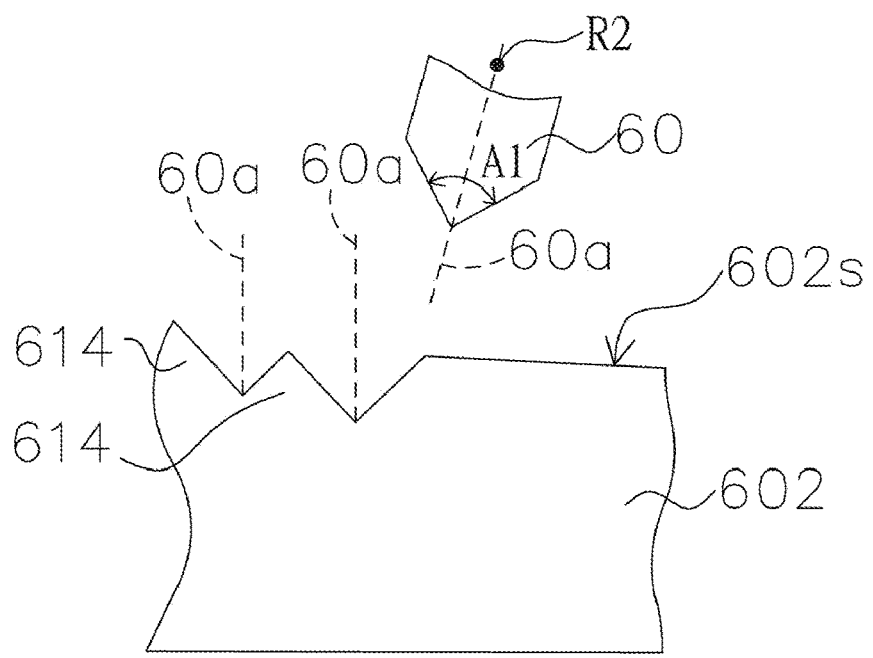
Figure 8C:
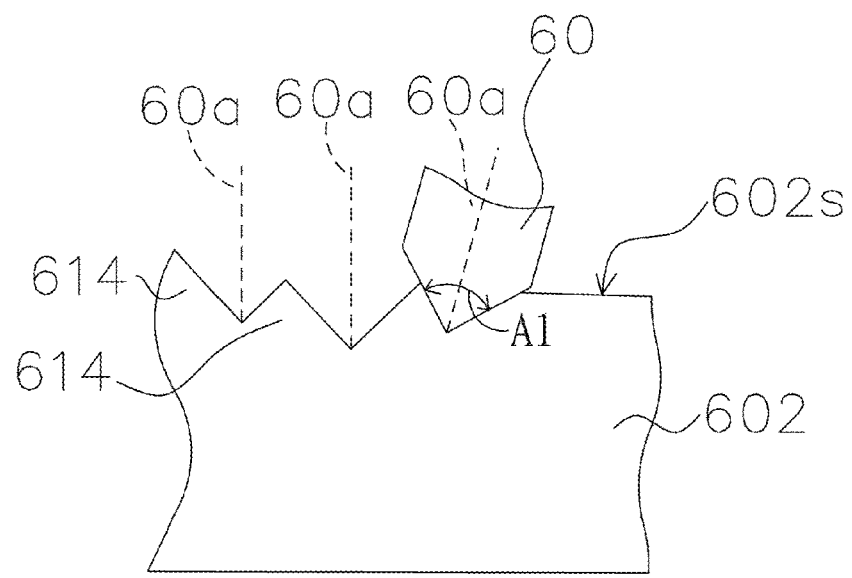
Figure 8D:
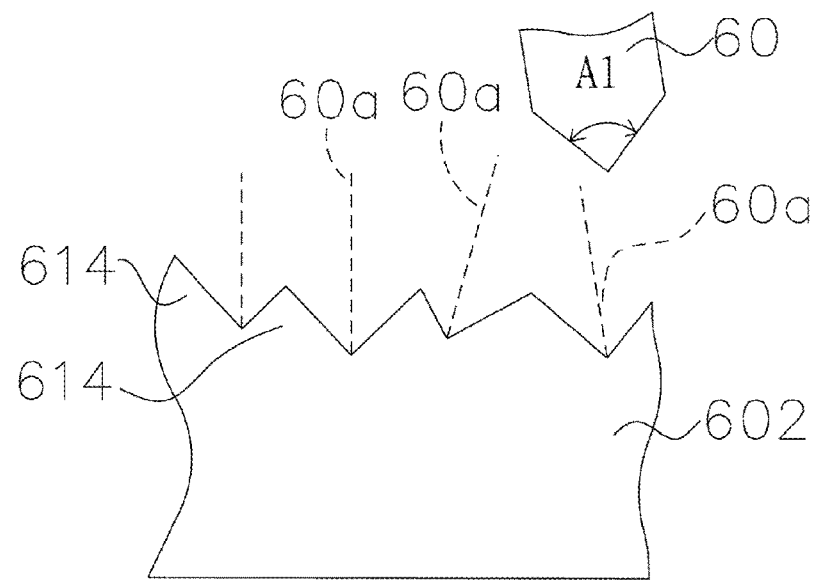

FIGS. 8A to 8D are exemplary diagrams of a manufacturing method for a diffraction grating in accordance with an embodiment of the present disclosure. Referring to FIGS. 8A and 8B, the manufacturing method is similar to the method shown in the FIGS. 6A-6E. The difference is that during formation of at least one of the diffraction structures 614, the blade 60 is tilted corresponded to a reference axis R2, and the reference axis R2 is parallel to the generator of the concave cylindrical surface 602s. The tilted blade 60 then rules the concave cylindrical surface 602s to form the diffraction structures 614 which form a plurality of grooves, where each of the grooves is formed between two adjacent diffraction structures 614. The bottoms of the grooves form a plurality of bottom angles and a plurality of bisector planes of the bottom angles, where the bottom angle is equal to angle A1. As shown in FIG. 8C, the bisector planes 60a of at least two angles (i.e bottom angles) are not parallel to each other. As shown in FIG. 8D, the bisector planes 60a of at least three angles (i.e bottom angles) are not parallel to each other.

Besides the blade ruling, the manufacturing method for the diffraction grating may implement molding technique using a mold that is able to mold the aforementioned embodiments of the diffraction grating 210, 310, 410a, 410b, 410c, 410d.

Figure 9A:
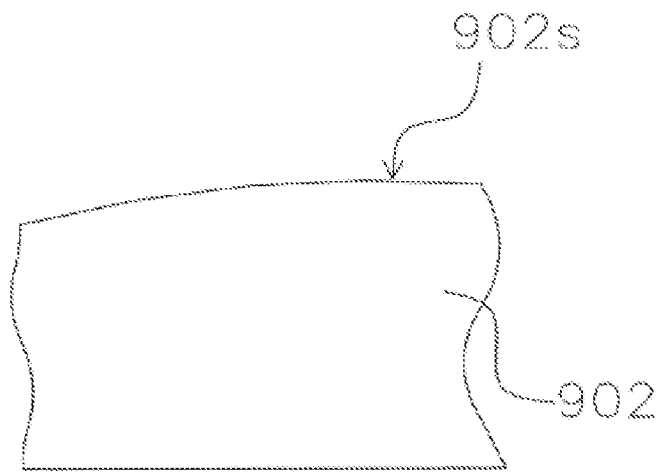
FIGS. 9A to 9D are exemplary diagrams of a manufacturing method for a mold in accordance with an embodiment of the present disclosure.

FIGS. 9A to 9D are exemplary diagrams of a manufacturing method for a mold in accordance with an embodiment of the present disclosure. In a mold manufacture, firstly as shown in FIG. 9A, is to provide a mold substrate 902. The mold substrate 902 has a convex cylindrical surface 902s. The mold substrate 902 may be a metal plate, glass plate or silicon wafer. In the present specification, the formation of the convex cylindrical surface 902s is same to the aforementioned of forming the concave cylindrical surface 602s, such as machining.

Figure 9B:
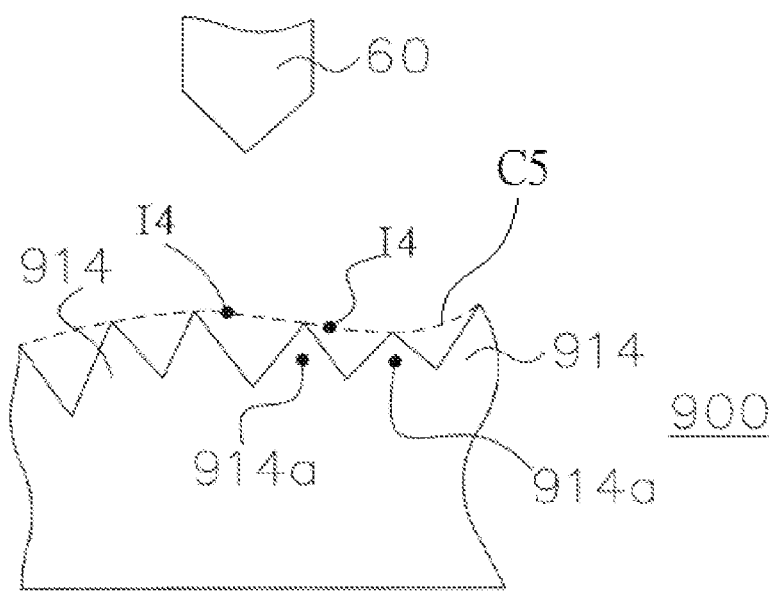

The convex cylindrical surface 902s, as shown in FIG. 9B, then forms a plurality of connected column structure 914 that forms a mold 900. Each column structure 914 has an axis 914a extending along the generator of the convex cylindrical surface 902s. The practice of forming such column structure 914 is similar to the method illustrated in FIGS. 6A-8D. For example, the blade 60 rules the convex cylindrical surface 902s to form a plurality of column structures 914, and such acts can be referenced to the acts disclosed in FIGS. 6A to 8D.

FIG. 9B illustrated a sectional view of the contour section of the column structures 914 which is perpendicular to the axises 914a. FIG. 9B is similar to the diffraction structures 214 shown in FIGS. 2C and 2D. The contour section shows a reference curve C5 which is a line connecting all the apexes of each two adjacent connected column structures 914. The reference curve C5 has a plurality of inflection points 14.

Figure 9C:
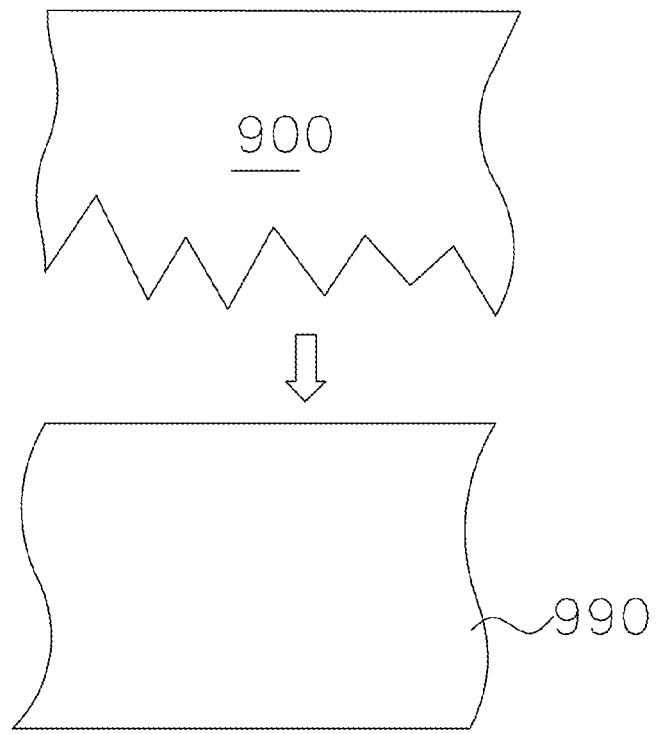
Figure 9D:
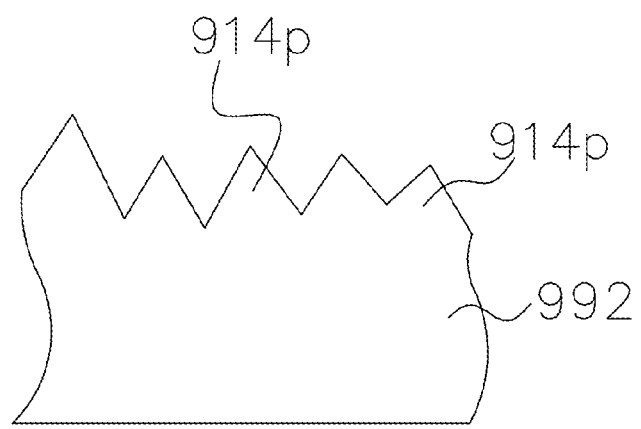

With reference to FIGS. 9C and 9D, when the mold 900 has been made, a substrate 990 is compressed by the mold 900 to replicate a diffraction grating 992 with a plurality of diffraction structures 914. The shape and the structure of the diffraction structure 914 may be the same as those of the diffraction structure 214, 314, 414a, 414b, 414c, or 414d. The substrate 990 may be made of ceramic, glass or metal. However, other than the compressed molding as disclosed in this embodiment, the diffraction grating 992 can be casted by other molding process such as injection molding or electrocasting. Therefore, using mold to casting the diffraction grating 992 is not limited to the process of compressed molding.

For the purposes of illustrations, it is noted that the blade ruling described in the aforementioned embodiments which illustrated in FIGS. 6A to 9D are examples to ease the explanation. In other embodiments, the disclosed diffraction grating and mold can be made using processes of photolithography and/or etching. The photolithography process includes two main steps: exposure and development.

For the photolithography step, in general, it uses an illumination to fabric patterns from a mask to a light-sensitive chemical (e.g., photoresist). In addition, photolithography process may also use interference exposure, which uses two interfered light beam to illuminate the photoresist. Using both interference exposure and development processes also known as holography.

Figure 10:
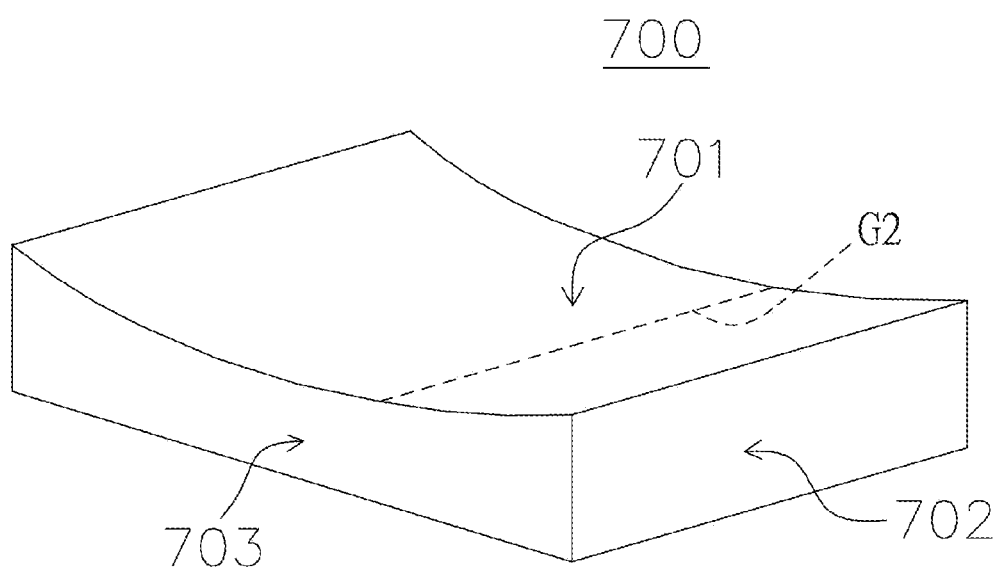
FIG. 10 is an exemplary diagram of a substrate configured for making the diffraction grating of an embodiment in accordance with present disclosure.

FIG. 10 is an exemplary diagram of a substrate configured for making the diffraction grating of an embodiment in accordance with present disclosure. The substrate 700, as shown in FIG. 10, has a concave cylindrical surface 701 and a plurality of side surfaces 702, 703. The concave cylindrical surface 701 connects to the side surfaces 702, 703, and the side surfaces 702, 703 are connected together. The generator G2 of the concave cylindrical surface 701 and the side surface 702 extending in the same direction. The generator G2 is parallel to the side surface 702, and is perpendicular to the side surface 703. Further, the substrate 700 may be the aforementioned substrate 602, and the inner concave surface 701 may be a polynomial curved surface with at least two degree. For example, the inner concave surface 701 is a quadratic curved surface without any inflection point, or is a curved surface with at least 4 degree that has at least two inflection points.

When apply photolithography process to form the diffraction structures, it uses a photoresist layer (not shown) covered on the top of the concave cylindrical surface 701. The concave cylindrical surface 701 then sequentially exposed (and/or shield with mask) to the illumination for removing the photoresist layer, which creates the photoresist pattern. As above mentioned, the photoresist may also use the technique of implementing interference exposure. The photoresist pattern are formed using holography process.

After the photoresist pattern formed, a light reflecting layer (not shown) is provided to be fully covered on the concave cylindrical surface 701 and the photoresist layer. The light reflecting layer, in this embodiment, may be a metal layer. Etching process may not be required. The light reflecting layer and the photoresist pattern can be considered as the diffraction structures, and thus the diffraction grating is obtained. The process of forming a light reflecting layer can be accomplished using techniques of electroplating, or electroless plating, Physical Vapor Deposition (PVD). The PVD may be the process of sputtering or evaporation.

In another embodiment, the photoresist pattern may used as a mask, which allows the substrate 700 to be etched. The etching process may be the wet etching or dry etching. The dry etching may be the plasma etching or oblique ion beam etching. There are two different ways of implementing etching process for diffraction grating. One way is to etch the substrate 700 for creating an aforementioned light reflecting layer. Another way is to remove the photoresist pattern that forms basic diffraction grating.

It is noted that the light reflecting layer may not be necessary after the photoresist pattern has been removed. A person skilled in art may realize that when the substrate 700 is a metal plate, the metal material of itself has a characteristic of reflecting lights. Therefore, the surface of the etched substrate 700 will form diffraction structures that is able reflect lights without additional light reflecting layers. However, if the material of the substrate 700 is selected using poor light reflecting material such as glass plate, the light reflecting layer can be add after the etching process of the substrate 700.

In other embodiment, forming the diffraction structures from the concave cylindrical surface 701, it may start from the side surface 703. In this embodiment, a photoresist pattern is formed on the side surface 703 using photolithography process. The photoresist pattern can be considered as a mask that allow the etching process which removes parts from the substrate 700 within the concave cylindrical surface 701. Such process may reference to an US patent application with publication No. 20130170043 for details. Further, abovementioned processes may also adapted to the manufacturing method of the mold 900 illustrated in FIG. 9C. With processes of photolithography and etching, a photoresist pattern may formed on the surface of the convex cylindrical surface 902s of the mold substrate 902.

However, it is noted that the diffraction structures made by photolithography and etching, the diffraction structures may not elongate to two sides of the substrate (see FIG. 2C). Further, dry etching has a drawback due to its limit. The diffraction structure formed from dry etching, the surface roughness on the two ends of each diffraction structure may be different. Even more, the cross section contours of two ends of a diffraction structure are different. It will change the light paths to some portions of the diffraction structure, and generates the stray light.

Accordingly, the dry etching process compared to blad ruling process, the effective diffraction area made by the dry etching is limited, which is poor for increasing the sensitivity of the spectrometer. Using the holography process with oblique ion beam etching for making the diffraction structures, the two ends of each of the diffraction structure still able to elongate toward two sides of the substrate which illustrated as the diffraction structures 214 of FIG. 2C.

With reference to FIGS. 2A-2D again, because of the diffraction structures 214 arranged along the concave cylindrical surface C1 and reference curve C2 has a plurality of first inflection points I. The diffraction grating 210 is not only diffract the optical signal 20, but also changes the shape of the focal surface F1. In order to make the shape of focal surface F1 fully fit to the optical receiving surface 232, the diffraction structures 214 may need some special design.

Figure 11A:
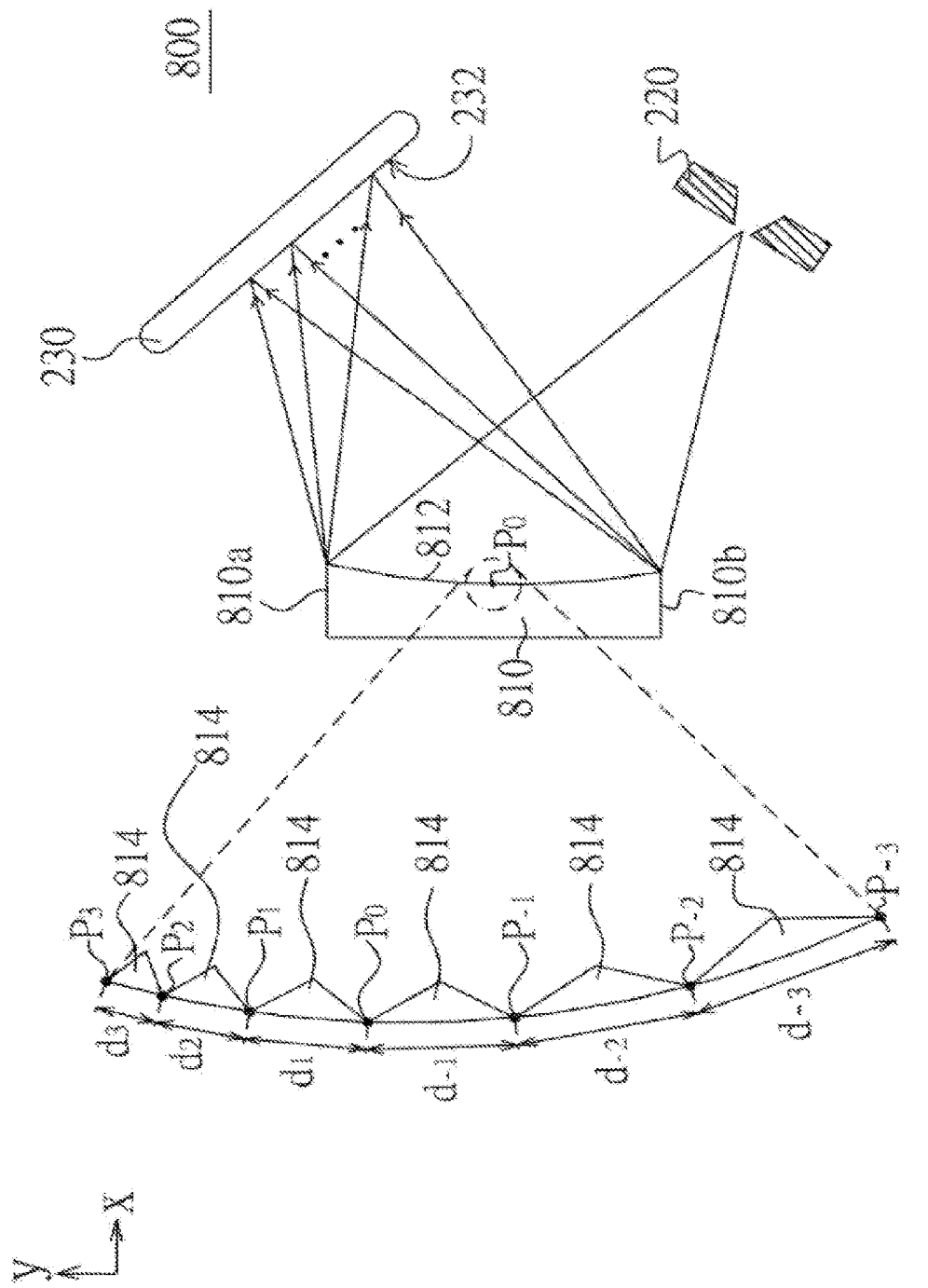
FIG. 11A is an exemplary diagram of optical paths of a spectrometer in accordance with another embodiment of the present disclosure.
Figure 11B:
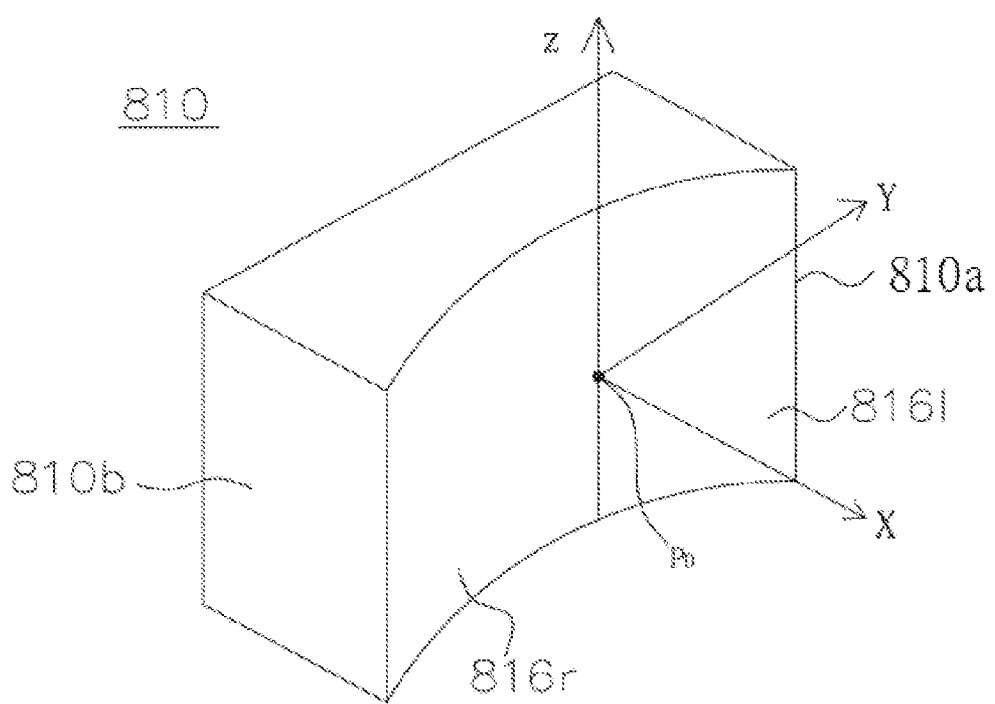
FIG. 11B is a perspective view of the diffraction grating illustrated in FIG. 11A.

FIG. 11A is an exemplary diagram of optical path of a spectrometer in accordance with another embodiment of the present disclosure. FIG. 11B is a perspective view of the diffraction grating illustrated in FIG. 11A. As shown in FIGS. 11A and 11B, the spectrometer 800 includes an input member 220, a diffraction grating 810 and an optical sensor 230. The spectrometer 800 is similar to the spectrometer 200, which the diffraction grating 810 can be the aforementioned embodiments of the diffraction grating 210, 310, 410a, 410b, 410c, 410d, 510 or 992.

The diffraction grating 810 includes a grating profile surface 812, a plurality of diffraction structures 814, a first side surface 810a and a second side surface 810b. When the diffraction grating 810 is the diffraction grating 210 of FIG. 2C, the grating profile surface 812 is substantially corresponded to the concave cylindrical surface C1. The first side surface 810a and the second side surface 810b are opposite to each other. The first side surface 810a is more close to the optical sensor 230 than the second side surface 810b, and the second side surface 810b is more close to the input member 220 than the first side surface 810a. The grating profile surface 812 is a freeform surface and is non-spherical surface. The grating profile surface 812 comprises a central point P0, a left curved surface 816l and a right curved surface 816r. The left curved surface 816l is placed between the first side surface 810a and the central point P0, and the right curved surface 816r is placed between the second surface 810b and the central point P0.

Pitches are defined on the grating profile surface 812. The pitches comprises a first pitch set and a second pitch set. The first pitch set is on the left curved surface 816l, and the second pitch set is on the right curved surface 816r. The measurement variations of each pitch corresponds to the number of the pitches. The average of the first pitch set is different from the average of the second pitch set.

In an embodiment, the pitches of the diffraction structures 814 is on the grating profile surface 812, and the measurements of each pitch corresponds to the number of the pitches. For example, there are 3000 diffraction structures 814 which defines 3000 pitches on the grating profile surface 812, and the 3000 pitches have 300 measurement variations. The ratio of the measurement variation and the diffraction structures may be 5-100%, 10-100% or 15-100%.

For convenience of elaboration, since each measured value of pitches are different, and thus FIG. 11A illustrates the pitch distances of first pitch set using d1-d3 as example, and d-1-d-3 for the pitch distances of the second pitch as example.

In first pitch set, the measurements of the pitches are getting smaller as away from the central point P0. As shown in FIG. 11A, the pitch distance d1 is larger than the pitch distance d2. And the pitch distance d2 is larger than the pitch distance d3. In other words, the pitches in the first pitch set, the pitch away from the central point P0 and closer to the first side surface 810a has smaller measured distance. In second pitch set, the measurements of the pitches are getting larger as away from the central point P0. As shown in FIG. 11A, the pitch distance d-1 is smaller than the pitch distance d-2. And the pitch distance d-2 is smaller than the pitch distance d-3. Accordingly, the pitches in the second pitch set, the pitch away from the central point P0 and closer to the second side surface 810b has larger measured distance.

The grating profile surface 812 further comprises a plurality of profile points. For the purposes of illustrations, and convenience of elaboration. FIG. 11A only illustrates the central point P0, and profile points of P1, P2, P3, P-1, P-2, P-3. The pitch distances d1 to d3 are lengths of segments P0P1, P1P2, P2P3, respectively. The pitch distances d-1 to d-3 are lengths of segments P0P-1, P-1P-2, P-2P-3, respectively. Accordingly, the segment lengths of pitch distances d1 to d3 are different, and the segment lengths of pitch distances d-1 to d-3 are different as well.

In this embodiment, the diffraction grating 810 includes grating profile surface 812, the diffraction structures 814, and thus the diffraction grating 810 has abilities of optical divergence and convergence, which is able to replace the collimator and focus lens in the traditional optical system. It is able to reduce the number of components used in the spectrometer 800. Further, when the grating profile surface 812 is an non-spherical freeform surface, the grating profile surface 812 will make the focal surface (i.e., focal place F1 of FIG. 2A) similar to the optical receiving surface 232 of the optical sensor 230.

Figure 12:
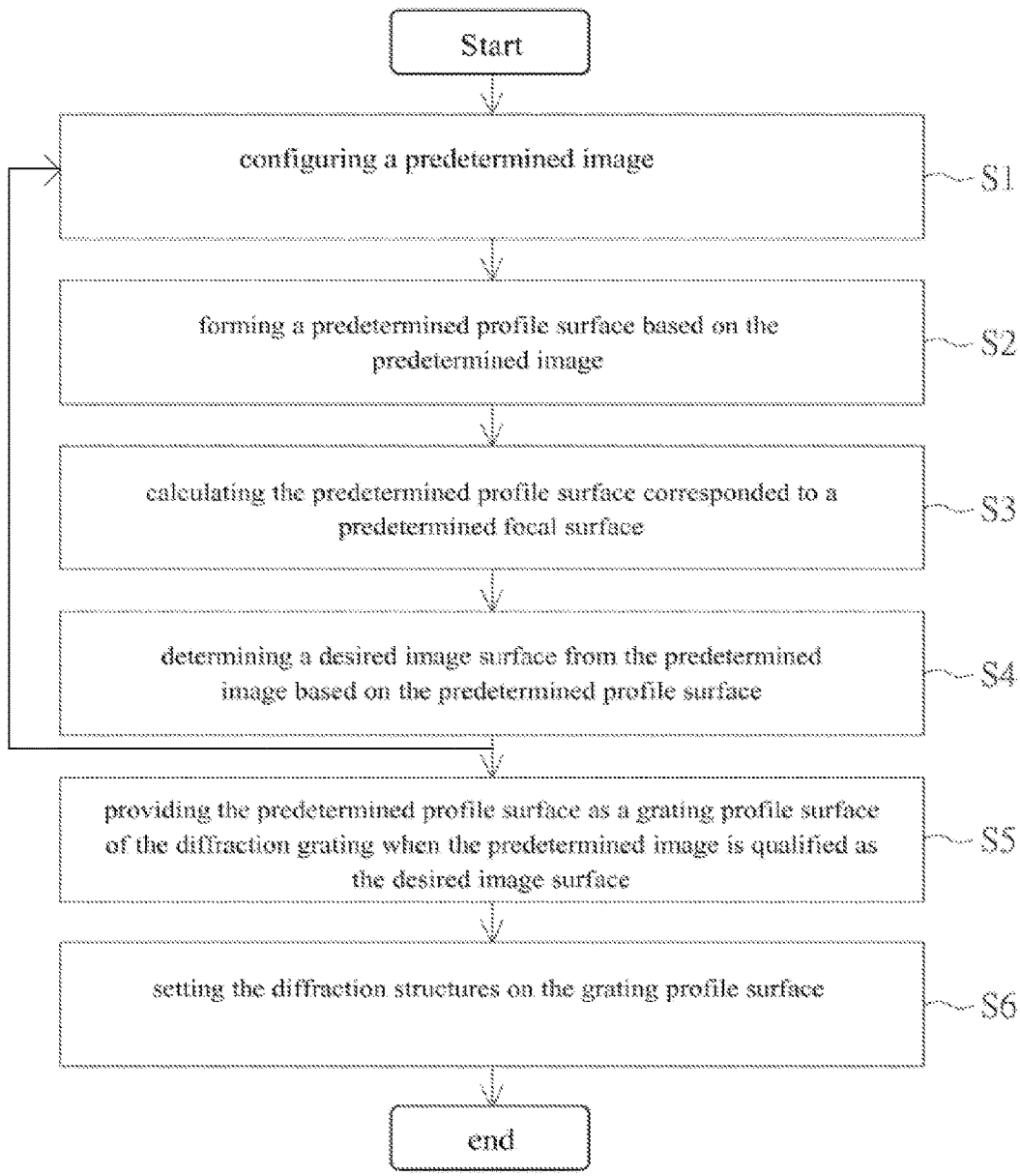
FIG. 12 is a flow chart of a method for designing the diffraction grating in accordance with the embodiments illustrated in FIGS. 11A and 11B.

FIG. 12 is a flow diagram of a design method for the diffraction grating in accordance with the embodiments illustrated in FIGS. 11A and 11B. The design method for the diffraction grating 810, as shown in FIG. 12, includes acts of S1 configuring a predetermined image, S2 forming a predetermined profile surface based on the predetermined image, S3 calculating the predetermined profile surface corresponded to a predetermined focal surface, and S4 determining a desired image surface from the predetermined image based on the predetermined profile surface. The predetermined image is an image preset by a designer.

The design method further includes acts of S5 providing the predetermined profile surface as a grating profile surface of the diffraction grating when the predetermined image is qualified as the desired image surface, and S6 setting the diffraction structures on the grating profile surface. Further, in acts of S4, when the predetermined image is not qualified as the desired image surface, the method reconfigures the predetermined image for a new predetermined profile surface.

Figure 13:
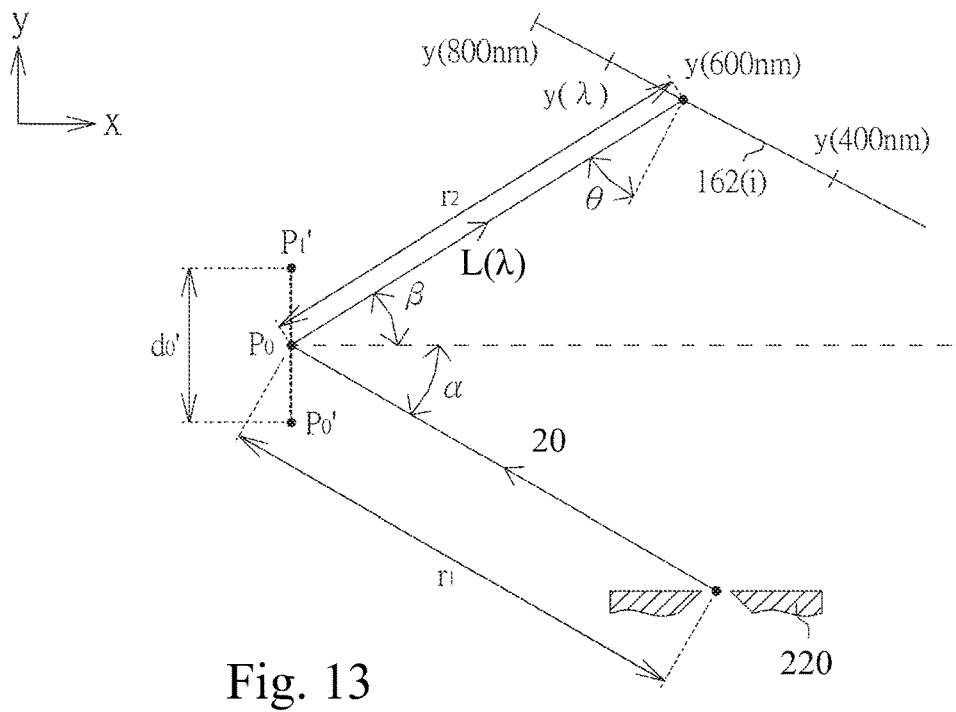
FIG. 13 is an exemplary diagram of a predetermined image of FIG. 12.

FIG. 13 is an exemplary diagram of a predetermined image of FIG. 12. As shown in FIG. 13, the predetermined image can be configured when a first distance r1, a second distance r2, angle θ and the shape of the predetermined image 162(*i*) are determined.

Angle θ is the angle of a perpendicular line and a spectral component of a spectrum of a predetermined waveform. The perpendicular line is perpendicular to the predetermined image 162(*i*). For example, when the waveform sensing range of the optical sensor is between 400 to 800 nm, and the predetermined waveform is 600 nm. The angle θ is the angle of the perpendicular line and the spectral component L(λ) of the 600 nm spectrum. The first distance r1 is the distance of an optical signal 20 travels from the input member 220 to the profile segment. The second distance r2 is the distance of the optical beam travels from the profile segment to the predetermined image 162(*i*). When the predetermined profile surface generated based on the predetermined image 162(*i*) is not qualified for the desired image surface, the new predetermined profile surface can be reconfigured by adjusting the angle θ, the first distance r1, the second distance r2 or the shape of the predetermined image.

The grating equation can be shown as following:

$$\sin\alpha + \sin\beta = \frac{m\lambda}{d}$$

As shown in FIG. 13, the pitch d is the pitch distance of the spectral component L(λ) to the profile segment. The incidence angle α is the angle of the optical signal 20 emitting to the profile segment. In this embodiment, the spectral component L(λ) can be one of the spectral components 21, 22, and 23 shown in FIG. 2A. The reflected angle β is the angle of the spectral component L(λ) emitting from the profile segment. Waveform (λ) is the waveform length of the spectral component L(λ). m is the diffraction degree, and it can be 0, positive integer or negative integer. When the optical signal 20 emitting to the central point P0, it can be considered that the optical signal 20 approaches to the virtual profile segment P0'P1', and the pitch d of the virtual profile segment P0'P1' is equal to the initial distance d0'.

The initial distance d0', in general, is normally decided by the manufacturing process. For field of the present semiconductor etching process for fabricating a semiconductor based diffraction grating, the limit is about few micrometers. In this embodiment, the initial distance d0' is an actual distance of a grating pitch. However, in another embodiment, the initial distance d0' can be used for the pitch from the central point P0 to a successive profile point.

By knowing the pitch d, the incidence angle α and diffraction degree m, the reflected angles β for each of different waveform spectrum can be determined using the abovementioned grating equation. Each spectral component L(λ) of the different waveform spectral components emitting to the predetermined image 162(*i*) has different reflected angles β. The spectral component L(λ) intersected the predetermined image 162(*i*) to form a plurality of imaging point.

For example, the spectrum ranged from 400 to 800 nm. When the predetermined spectral component L(λ) waveform length is 400 nm, the spectral component L(400 nm) and the predetermined image 162(*i*) intersects at the imaging point y(400 nm). When the predetermined spectral component L(λ) waveform length is 600 nm, the spectral component L(600 nm) and the predetermined image 162(*i*) intersects at the imaging point y(600 nm). When the predetermined spectral component L(λ) waveform length is 800 nm, the spectral component L(800 nm) and the predetermined image 162(*i*) intersects at the imaging point y(800 nm).

Figure 14:
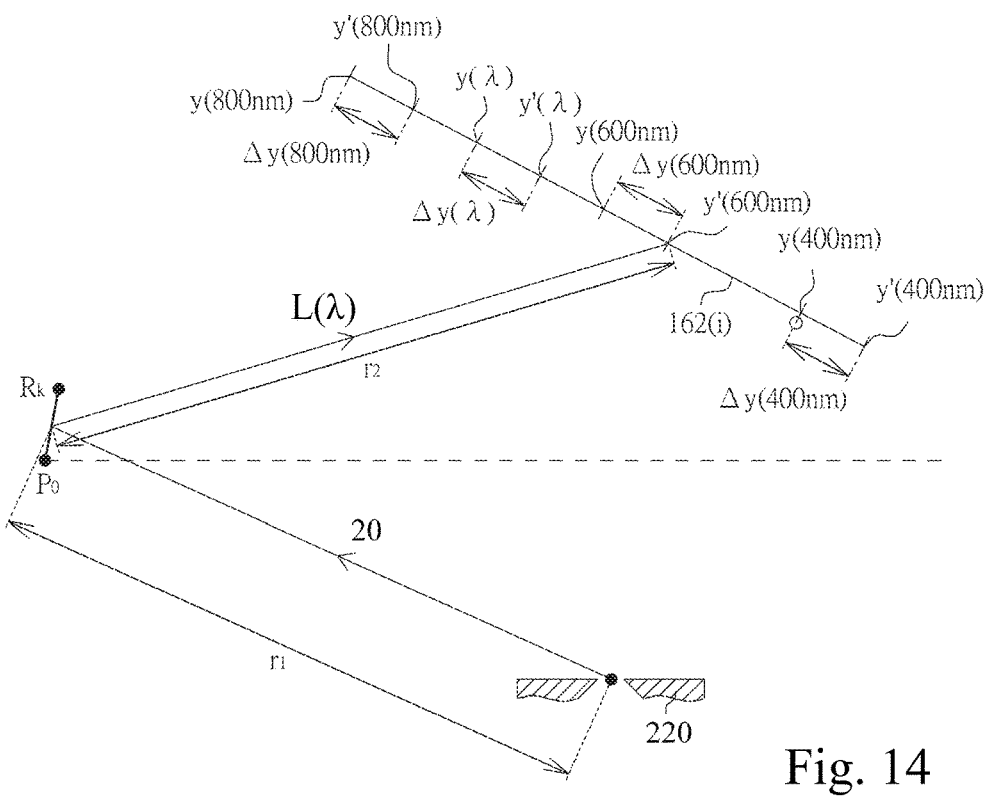
FIG. 14 is a schematic diagram of aberration.
Figure 15A:
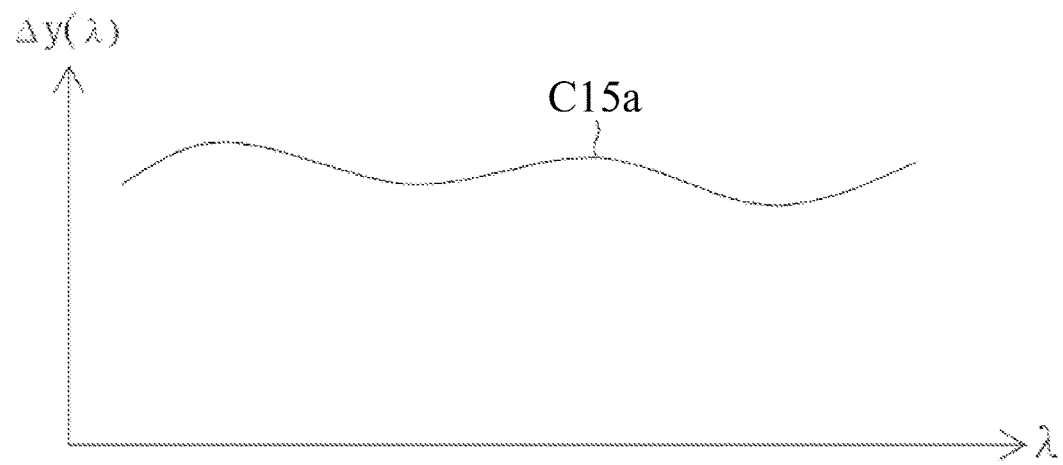
FIG. 15A shows an aberration characteristic curve of simulated local grating RkP0.
Figure 15B:
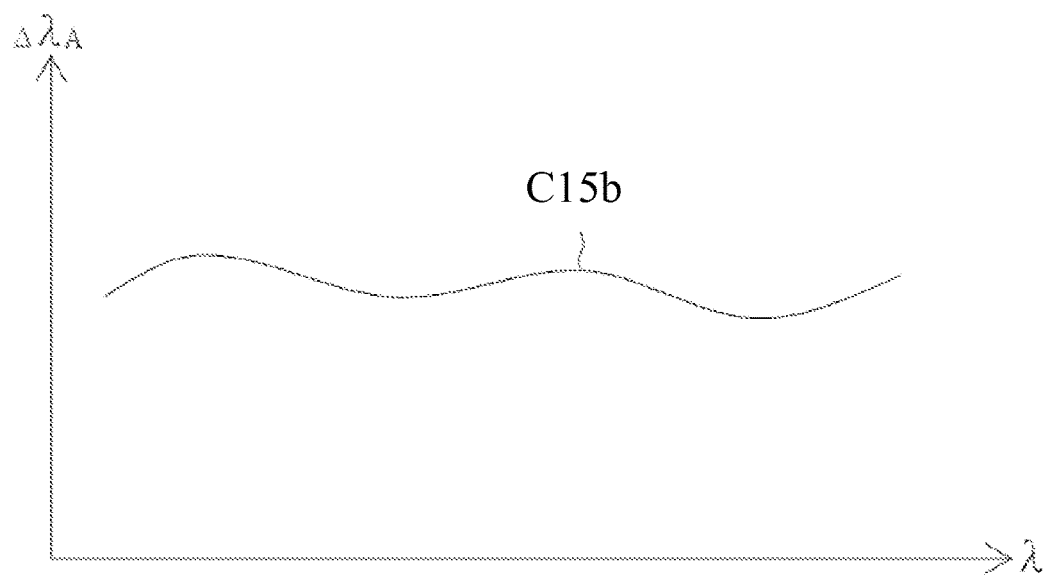
FIG. 15B shows an aberration induced spectral resolution characteristic curve of local grating $R_k P_0$.

FIG. 14 is an exemplary diagram of aberration. FIG. 15A is an exemplary diagram of aberration curve of profile segment RkP0. FIG. 15B is an exemplary diagram of the aberration induced spectral resolution curve of profile segment RkP0. The reference point Rk is a temporary selected point for next profile point during the optical simulation and adjustment. When the optical signal 20 emits to the profile segment RkP0, due to the change of pitch d and incidence angle α, the reflected angle β of the spectral component L(λ) change according to the abovementioned grating equation. Accordingly, the spectral component L(λ) and the predetermined image 162(*i*) intersect at the imaging point y' (λ) not the imaging point y(λ) which results an aberration Δy(λ) of imaging points y' (λ) and y(λ).

When the predetermined spectral component L(λ) waveform length is 400 nm, the spectral component L(400 nm) and the predetermined image 162(*i*) intersects at the imaging point y(400 nm). When the predetermined spectral component L(λ) waveform length is 600 nm, the spectral component L(600 nm) and the predetermined image 162(*i*) intersects at the imaging point y(600 nm). When the predetermined spectral component L(λ) waveform length is 800 nm, the spectral component L(800 nm) and the predetermined image 162(*i*) intersects at the imaging point y(800 nm). The aberration Δy(λ) of imaging points are Δy(400 nm), Δy(600 nm), Δy(800 nm) respectively. FIG. 15A illustrated the aberration curve C15a of showing the relationship of the waveform length λ and the aberration Δy(λ) of imaging points.

The aberration induced spectral resolution can be obtained by using the Δy(λ) to the aforementioned grating equation. In other words, the curve C15b illustrated in FIG. 15B may transform from the curve C15a using the grating equation.

With reference to FIGS. 13 and 14, to search all the profile points of predetermined image of the grating profile surface 812 of the diffraction grating 810, making the central point P0 as an initial point to start for searching the profile points on the grating profile surface 812 of the diffraction grating 810. Continue adjusting the location of the reference point Rk using the optical simulation and the aberration induced spectral resolution to find the next profile point. Then, replacing the initial point as the found profile point, and using the same acts for successive profile point until all the profile points of the predetermined image are found.

Figure 16A:
FIG. 16A shows a schematic diagram of central profile point $P_0$ and reference points $R_{11} \sim R_{1m}$.
Figure 16B:
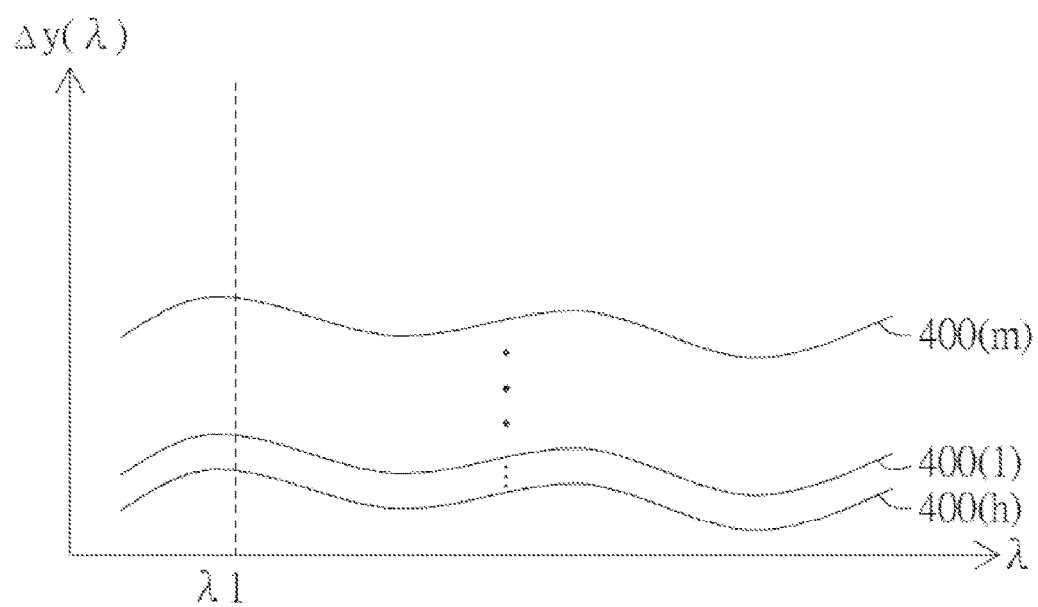
FIG. 16B shows the aberration characteristic curves of local gratings $R_{11}P_0 \sim R_{1m}P_0$ formed by the lines connecting reference points $R_{11} \sim R_{1m}$ and central profile point $P_0$.
Figure 16C:
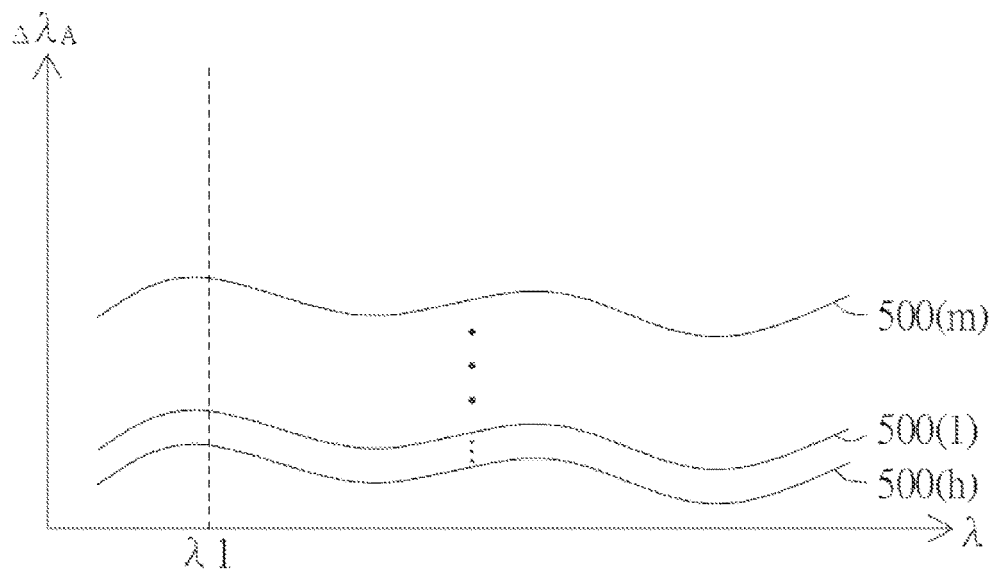
FIG. 16C shows an aberration induced spectral resolution characteristic curve of local gratings $R_{11}P_0 \sim R_{1m}P_0$.

Example here below explain how to adjust pitch and the grating profile. Reference Rab means the bth reference point has been adjusted for ath adjustments. As shown in FIGS. 16A, 16B and 16C. FIG. 16A is an exemplary diagram of central P0 and reference point R11 to R1*m*. FIG. 16B is an exemplary diagram of the aberration curve for line from reference R11 to R1*m* to the central point P0 which forms the simulated profile segments R11P0 to R1*m*P0. FIG. 16C is an exemplary diagram of the aberration induced spectral resolution curve for simulated grating region R11P0 to R1*m*P0. The embodiment shown in FIGS. 16A, 16B and 16C, it selects the reference points along the longitudinal axis and then along the latitudinal axis. However, it is not limit to that way, it may select reference points along the latitudinal axis then the longitudinal axis.

As abovementioned, the first optical simulation using the central point P0 as an initial point for next profile point. The selection of the reference points R11 to R1m is to choose m reference points from the initial point along the y axis, the distance of each two points of m reference point is fixed. The fixed distance may determined by the designer. However, in another embodiment, the distance of each two points of m reference points may not be fixed.

The m line segments line up from the reference R11 to R1m and central point P0 show pitch of profile segment R11P0 to R1mP0 in optical simulation. Each simulated segment R11P0 to R1mP0 will result total m different degrees of image aberration. FIG. 16B illustrates the m aberration curves of $\Delta y(\lambda)$ from 400(1) to 400(m).

In order to obtain better image formation quality, an optimum aberration induced spectral resolution curve 500 (h), as shown in FIG. 16C, can be selected for R1h as the optimum reference point. In this embodiment, the optima aberration induced spectral resolution is defined as minimum sum of the aberration of all reference points. However, in other embodiments, the optimum aberration can also be the minimum average of all reference points or the smallest value of the aberration.

Figure 17A:
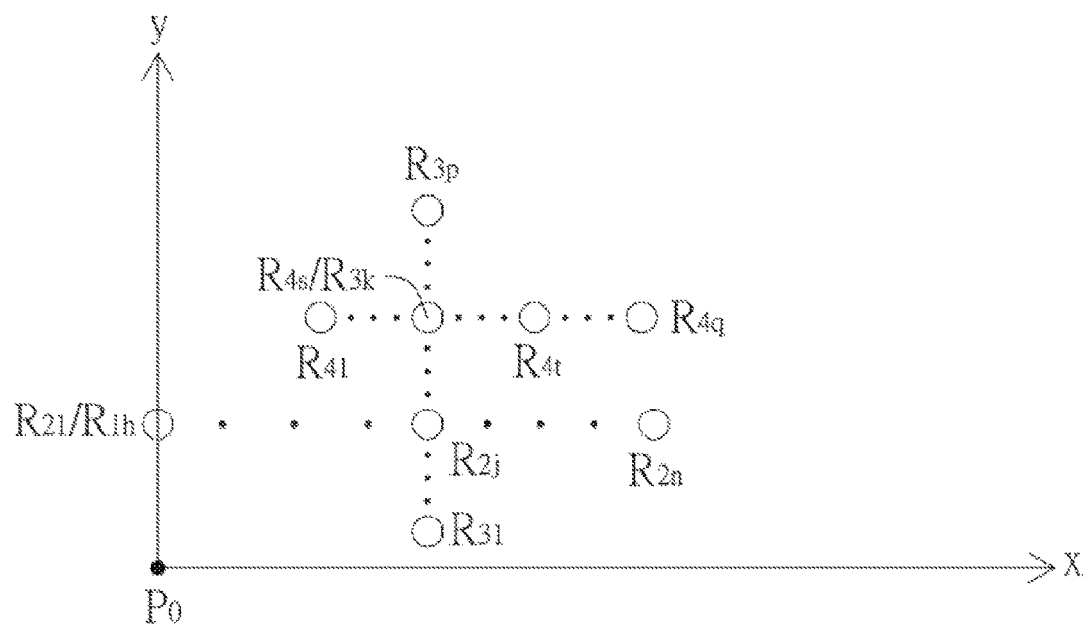
FIG. 17A shows a schematic diagram of central profile point $P_0$, reference point $R_{1n}$, reference points $R_{21} \sim R_{2n}$, and reference points $R_{31} \sim R_{3p}$.
Figure 17B:
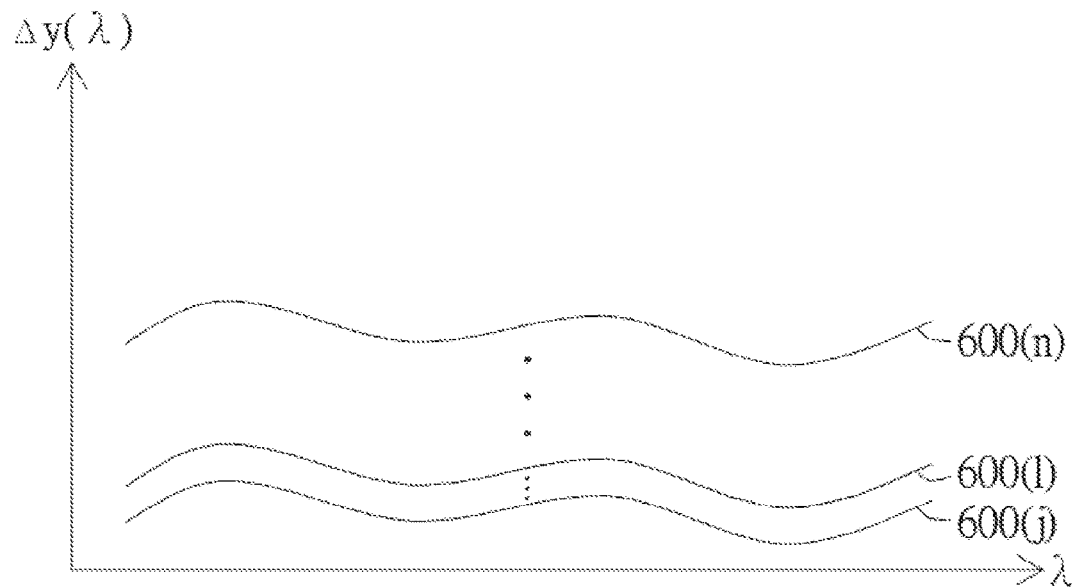
FIG. 17B shows an aberration characteristic curve of n simulated local gratings $R_{21}P_0 \sim R_{2n}P_0$ formed by the lines connecting reference points $R_{21} \sim R_{2n}$ and central profile point $P_0$.
Figure 17C:
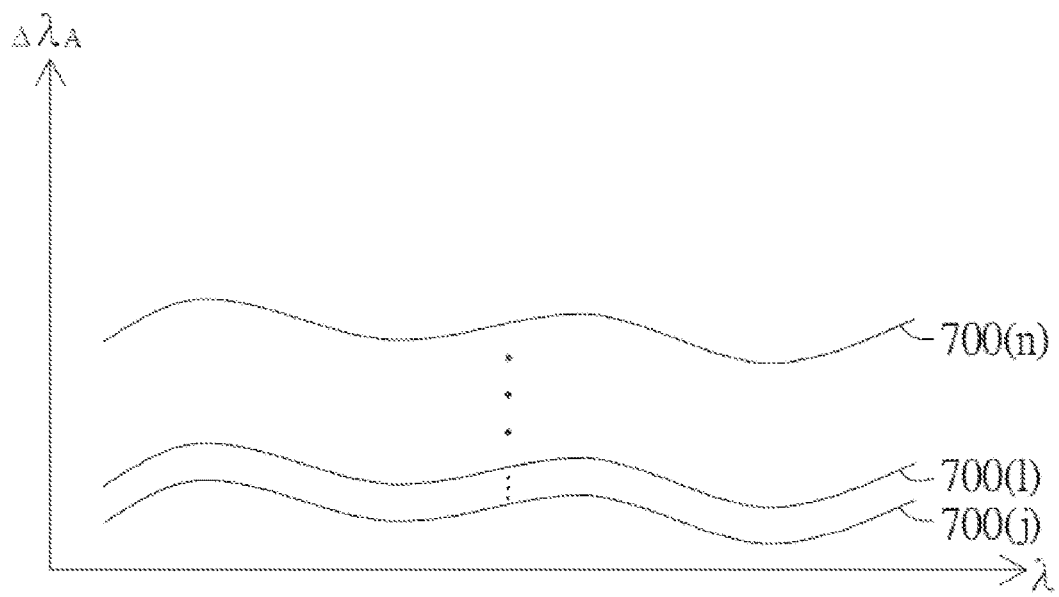
FIG. 17C shows an aberration induced spectral resolution characteristic curve of n simulated local gratings $R_{21}P_0 \sim R_{2n}P_0$.

FIG. 17A is an exemplary diagram of central point P0, reference points R1h, R21-R2n and R31-R3p. FIG. 17B is an exemplary diagram of the aberration curve for line from reference R21 to R2n to the central point P0 which forms the n simulated profile segments R21P0 to R2nP0. FIG. 17C is an exemplary diagram of an aberration induced spectral resolution of n simulated profile segments R21P0 to R2nP0.

When the optimum reference point R1h is found, using the R1h as an initial point for second optical simulation and adjustment. Successively selecting the n reference points from R21 to R2n along the longitudinal axis of reference point R1h. The selection of reference points from R21 to R2n is to use a fixed distance from the initial point. The designer decides the length of the fixed distance. Further, the reference R1h may be one of the reference points of R21 to R2n.

Similarity, FIG. 17B illustrates aberration $\Delta y(\lambda)$ of n simulated profile segments R21P0 to R2nP0. The aberration curves of 600(1) to 600(n) corresponded to the n simulated profile segments R21P0 to R2nP0, which is able to use the grating equation for generating the aberration induced spectral resolution curves 700(1) to 700(n) as shown in FIG. 17C. In order to get better formation of image, choosing an optimum aberration induced spectral resolution curve 700(j) from the aberration induced spectral resolution curves 700 (1) to 700(n), and uses the reference point R2j as the optimum reference point.

Then, using the reference point R2j as a new initial point for third optical simulation and adjustment, Successively selecting the p reference points from R31 to R3p along the longitudinal axis of reference point R2j. The selection of reference points from R31 to R3p is to use a fixed distance from the initial point. In this embodiment, the fixed distance of the third optical simulation is smaller than the first optical simulation. The degree of scaling down can be decided freely.

For example, the fixed distance of the third optical simulation may be ½ of the first optical simulation. The fixed distance of the fifth optical simulation may be ½ of the third optical simulation. When the variation of aberration convergent to a predetermined value, the scaling down of the fixed distance stop. However, in another embodiment, the fixed distance of the third optical simulation can be the same as the fixed distance of the first optical simulation.

The reference point R2j itself can be one of the reference points of R31 to R3p. As above mentioned, the aberration curves corresponded to the p simulated profile segments R31P0 to R3pP0, which is able to use the grating equation for generating the aberration induced spectral resolution curves. In order to get better formation of image, choosing an optimum aberration induced spectral resolution curve from the aberration induced spectral resolution curves, and uses the reference point R3k as the optimum reference point.

After the reference point R3k has been found, using the reference point R3k as a new initial point for fourth optical simulation and adjustment. Successively selecting the q reference points from R41 to R4q along the longitudinal axis of reference point R3k. The selection of reference points from R41 to R4q is to use a fixed distance from the initial point. In this embodiment, the fixed distance of the fourth optical simulation is smaller than the second optical simulation. The degree of scaling down can be decided freely.

For example, the fixed distance of the fourth optical simulation may be ½ of the second optical simulation. The fixed distance of the sixth optical simulation may be ½ of the fourth optical simulation. When the variation of aberration convergent to a predetermined value, the scaling down of the fixed distance stop. However, in another embodiment, the fixed distance of the fourth optical simulation can be the same as the fixed distance of the second optical simulation.

Figure 18:
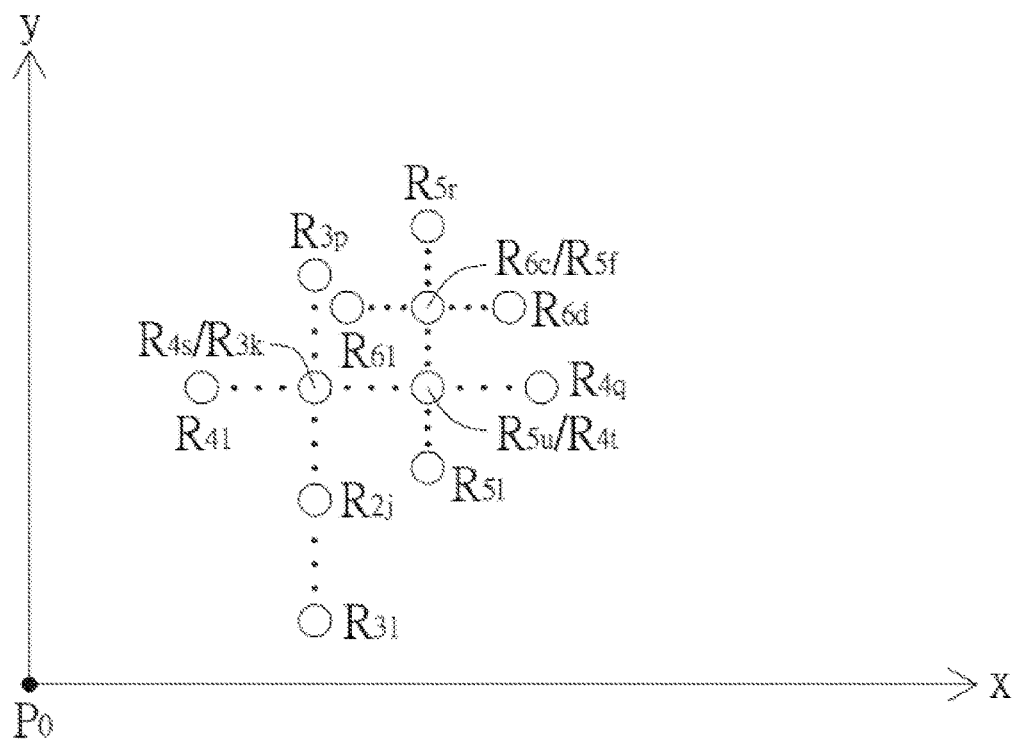
FIG. 18 shows a schematic diagram of central profile point $P_0$, reference points $R_{31} \sim R_{3p}$, reference points $R_{41} \sim R_{4q}$, reference points $R_{51} \sim R_{5r}$, and reference points $R_{61} \sim R_{6d}$.

The reference point R3k itself can be one of the reference points of R41 to R4q. For convenience of elaboration, FIG. 18 shows that the reference point R3k is the reference point of R4s. The aberration curves corresponded to the q simulated profile segments R41P0 to R4qP0, which is able to use the grating equation for generating the aberration induced spectral resolution curves. In order to get better formation of image, choosing an optimum aberration induced spectral resolution curve from the aberration induced spectral resolution curves, and uses the reference point R4t as the optimum reference point.

With reference to FIG. 18, FIG. 18 is an exemplary diagram of the central point P0, reference points R31-R3p, R41-R4q, R51-R5r and R61-R6d. Then, using R4t as new initial point for fifth optical simulation and adjustment, and successively selecting the q reference points from R51 to R5r along the longitudinal axis of reference point R4t.

The reference point R4t itself can be one of the reference points of R51 to R5r. FIG. 18 shows that the reference point R4t is the reference point R5u. The aberration curves corresponded to the r simulated profile segments R51P0 to R5rP0, which is able to use the grating equation for generating the aberration induced spectral resolution curves. In order to get better formation of image, choosing an optimum aberration induced spectral resolution curve from the aberration induced spectral resolution curves, and uses the reference point R5f as the optimum reference point.

Then, Using the reference point R5f as a new initial point for sixth optical simulation and adjustment, Successively selecting the d reference points from R61 to R6d along the longitudinal axis of reference point Rf. The reference point R5f itself can be one of the reference points of R61 to R6d. For convenience of elaboration, FIG. 18 shows that the reference point R5f is the reference point of R6c.

The aberration curves corresponded to the d simulated profile segments R51P0 to R5rP0, which is able to use the grating equation for generating the aberration induced spectral resolution curves. In order to get better formation of image, choosing an optimum aberration induced spectral resolution curve from the aberration induced spectral resolution curves, and uses the reference point R6c as the optimum reference point.

Repeating abovementioned step which is able to find the most optimum reference point for the profile point for left curved surface of the predetermined profile surface. Finding the optimum reference point for the profile point for right curved surface of the predetermined profile surface is the same. Using the central point P0 as an initial point to start with. Firstly, selecting reference points along −y axis, and then selecting reference points along the +x axis. Repeating the acts of finding profile point on the left curved surface to find the optimum reference point on the right curved surface. After all the profile points are determined, the predetermined profile surface is formed. Therefore, different predetermined images may form different predetermined profile surface, and different predetermined profile surfaces have different grating pitches.

Figure 19:
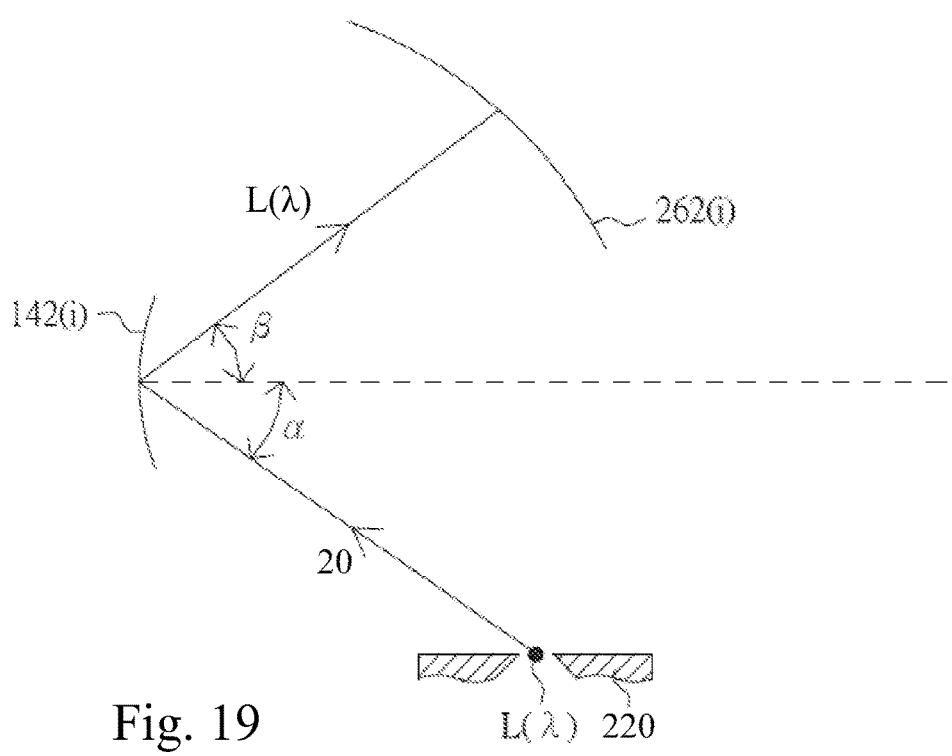
FIG. 19 is a schematic diagram of the predetermined profile surface corresponding to the predetermined focal surface.

With reference to FIG. 19, FIG. 19 is an exemplary diagram of the predetermined profile surface corresponding to the predetermined focal surface. The predetermined profile surface $142(i)$ is formed when all the profile points are found in left and right curved surfaces. Since all the pitches of the predetermined profile surface $142(i)$, the distance r1 from the input member 220 to the profile segments, diffraction degree m, incidence angle α are known, according to the abovementioned grating equation, the reflected angle β will change when the waveform length is changed. Therefore, by providing the same reflected angle β, the minimum beam position of the spectral component $L(\lambda)$ can be considered as a focusing point. The predetermined focal surface $262(i)$ is then formed by lining up all the minimum beam position.

Figure 20:
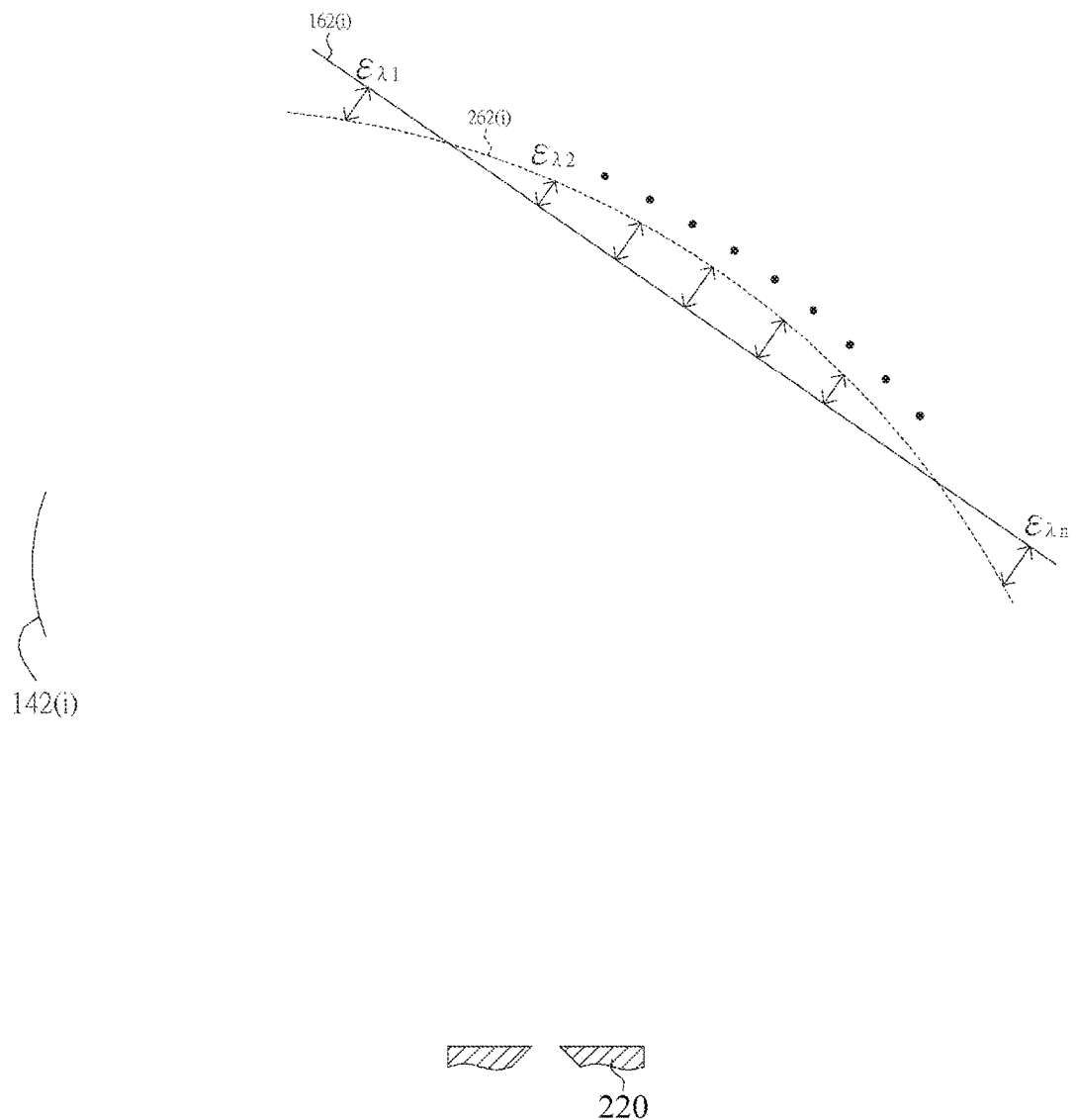
FIG. 20 is a schematic diagram of showing deviation distances between the predetermined focal surface and the predetermined image.

With reference to FIG. 20, FIG. 20 is an exemplary diagram of showing deviations of the predetermined focal surface and the predetermined image. In one embodiment, when the predetermined image is a flat surface, the deviation of the predetermined focal surface $262(i)$ and the predetermined image $162(i)$ can be used for determining whether the predetermined profile surface $142(i)$ of the predetermined image $162(i)$ is adequate. The deviation of the predetermined focal surface $262(i)$ and the predetermined image $162(i)$ includes deviations $\varepsilon\lambda1$ to $\varepsilon\lambda n$. If the predetermined profile surface is not adequate, then reconfigure for a new predetermined image by adjusting the angle θ, the first distance r1, the second distance r2 or the shape of the predetermined image.

In another embodiment, when the predetermined image is a curved surface, the adequateness of the predetermined profile surface can be determined using the mathematical analysis. The mathematical analysis may be using a group consisting of curve fitting and regression analysis. For example, the mathematical analysis uses both curve fitting and regression analysis, and such analyses can be implemented using computer software either purchased from the market or downloaded from the internet.

Figure 21:
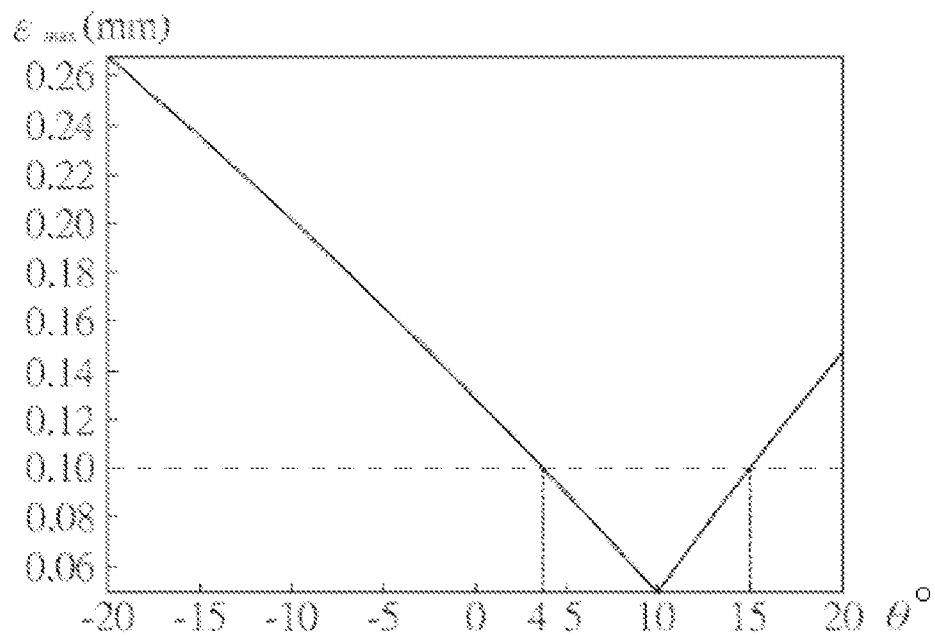
FIG. 21 is a schematic diagram of showing the largest deviation distance when the predetermined image is in different angles.
Figure 22:
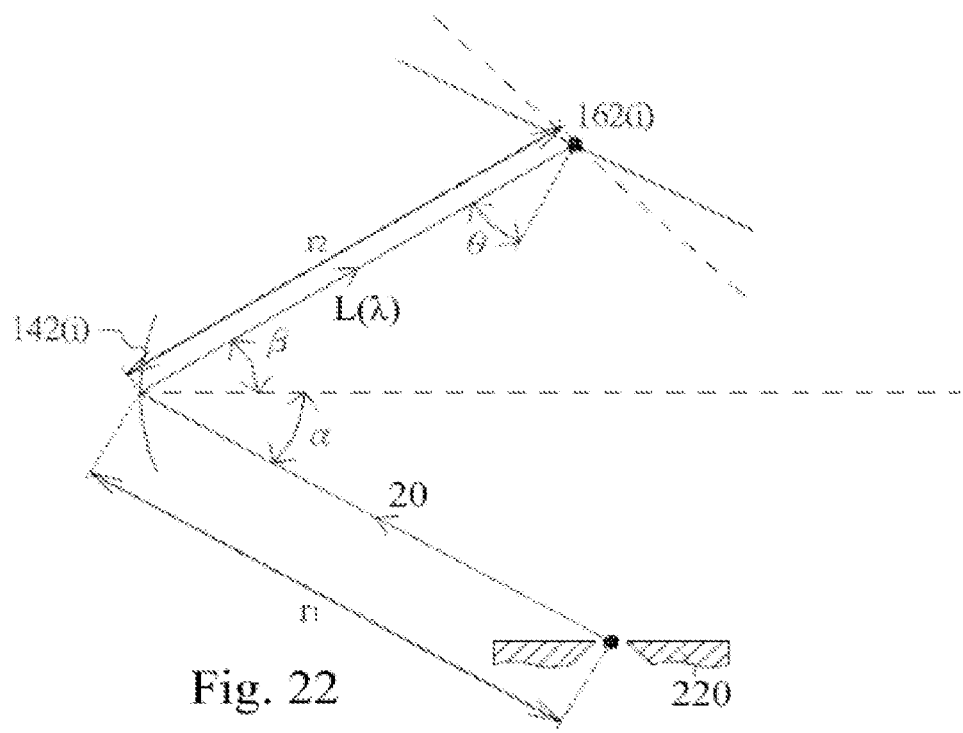
FIG. 22 is a schematic diagram of predetermined image and the predetermined profile surface.
Figure 23:
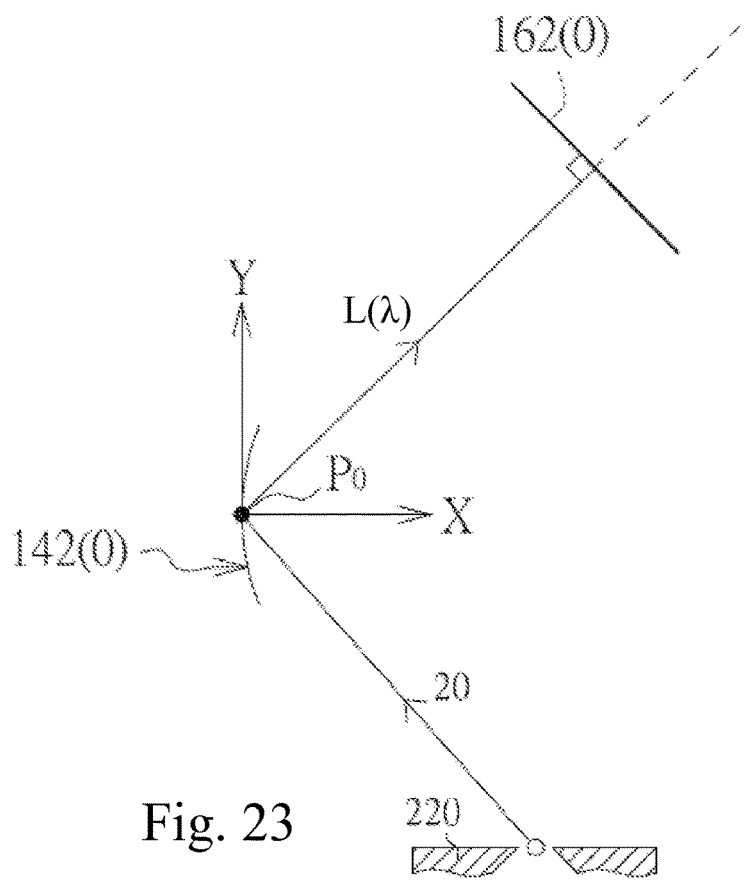
FIG. 23 is a schematic diagram of the predetermined image and the predetermined profile surface when the angle θ is 0.

With reference to FIGS. 20-22, FIG. 21 is an exemplary diagram of showing the largest deviation in different angles (i.e., −20 to 20 degrees) of the predetermined image. FIG. 22 is an exemplary diagram of predetermined image and the predetermined profile surface. A largest deviation εax is the largest value of the deviations $\varepsilon\lambda1$ to $\varepsilon\lambda n$ to the predetermined focal surface $262(i)$ and predetermined image $162(i)$.

In this embodiment, the value of the largest deviation εmax is to used for determining the predetermined image $162(i)$ is adequate or not, and selecting a predetermined image $162(i)$ from all the predetermined images for designing the predetermined profile surface $142(i)$, which the selected predetermined image $162(i)$ has the minimum largest deviation max. However, in another embodiment, the adequate predetermined image selection can use the average value of deviations $\varepsilon\lambda1$ to $\varepsilon\lambda n$, instead of the largest deviation εmax, which the selected predetermined image $162(i)$ has the minimum average deviation from all other predetermined images $162(i)$.

In yet another embodiment, the adequate predetermined image selection can use the minimum summation of deviations $\varepsilon\lambda1$ to $\varepsilon\lambda n$, which the selected predetermined image $162(i)$ has the minimum summation of deviations $\varepsilon\lambda1$ to $\varepsilon\lambda n$ from all other predetermined images $162(i)$. Further, in other embodiments, applying a threshold can be other solutions of determining the adequate predetermined image. For example, when the largest deviations εmax, the average value or the summation of the deviations $\varepsilon\lambda1$ to $\varepsilon\lambda n$ is smaller than the a predetermined threshold, the predetermined image $162(i)$ is selected.

As shown in FIG. 21, the minimum largest deviations max occurred at angle θ equals to 10 degrees, and thus the predetermined image $162(i)$ with 10 degree is selected. However, as above described, there are many way to determining the adequate predetermined image $162(i)$ such as giving a predetermined threshold.

For example, as shown in FIG. 21, if the predetermined threshold is 0.1, and then the predetermined images $162(i)$ with 4-15 degrees are qualified to be the selected predetermined image. Further, as shown in FIG. 21, the largest deviations max of the predetermined image $162(i)$ with 4 degree and the predetermined image $162(i)$ with 15 degree are the same. A person skilled in art will realize that the smaller angle θ may have less ghosting phenomenon, and thus the predetermined image $162(i)$ with 4 degree will be selected.

Figure 24:
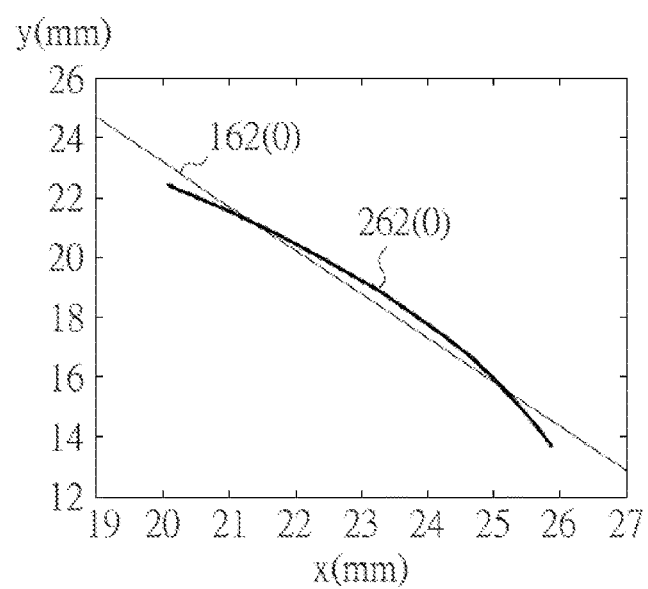
FIG. 24 is a schematic diagram of a predetermined focal surface when the angle θ is 0.
Figure 25:
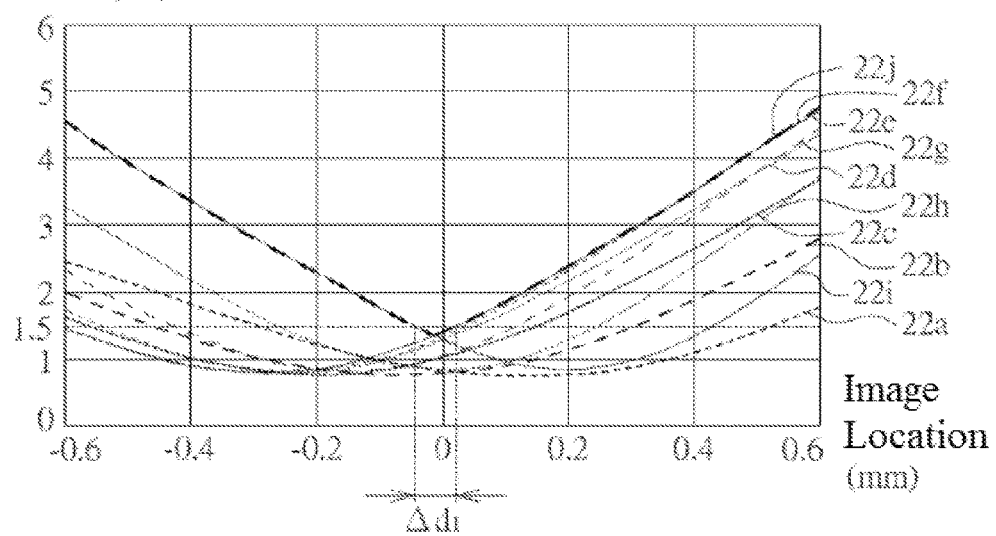
FIG. 25 is a schematic diagram of resolutions and corresponding image locations when the angle θ is 0.
Figure 26:
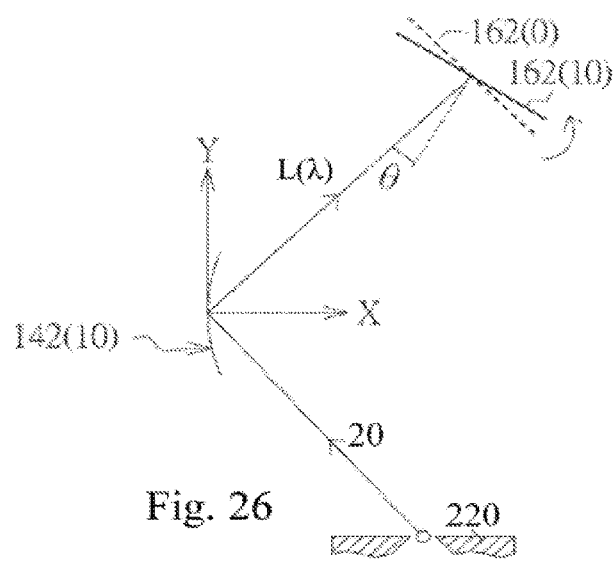
FIG. 26 is a schematic diagram of the predetermined image and the predetermined profile surface when the angle θ is 10 degrees.

With reference to FIGS. 22-25, FIG. 23 is an exemplary diagram of a predetermined image and predetermined profile surface with 0 degree angle θ, FIG. 24 is an exemplary diagram of a predetermined focal surface with 0 degree angle θ, and FIG. 25 is an exemplary diagram of resolutions and corresponding image locations with 0 degree angle θ. In FIG. 24, the origin of the grid represents the location of the central point P0, and the angle θ is 0 degree. The angle θ being 0 degree means that the predetermined waveform length is perpendicular to the predetermined image $162(0)$. As previous described, the predetermined image $162(0)$ generates the predetermined profile surface $142(0)$, and the predetermined focal surface $262(0)$ can be calculated from the predetermined profile surface $142(0)$ using the grating equation.

In FIG. 25, image location being 0 means the location of the predetermined focal surface $262(0)$, the greater value of the image location means the image location is more far away from the predetermined profile surface $142(0)$. On the contrary, the less value of the image location means the image location is close to the predetermined profile surface $142(0)$. The reflected spectral component $L(\lambda)$ from the predetermined profile surface $142(0)$ with different image locations may have different resolutions.

For example, if the reflected spectrum through the predetermined profile surface $142(0)$ are 380, 430, 480, 530, 580, 630, 680, 730 and 780 nm, the respect resolutions shown as curves 22a-22i in FIG. 25. Curve 22j has largest resolution of each of image locations. When the desired resolution is given as 1.5 nm, a corresponding depth of field (DOF) d1 can be found in curve 22j. It means when the optical sensor placed within the DOF Δd1, the resolution can be less than the 1.5 nm. If the DOF Δd1 is too narrow, configuring another predetermined image by adjusting its angle θ.

Figure 27:
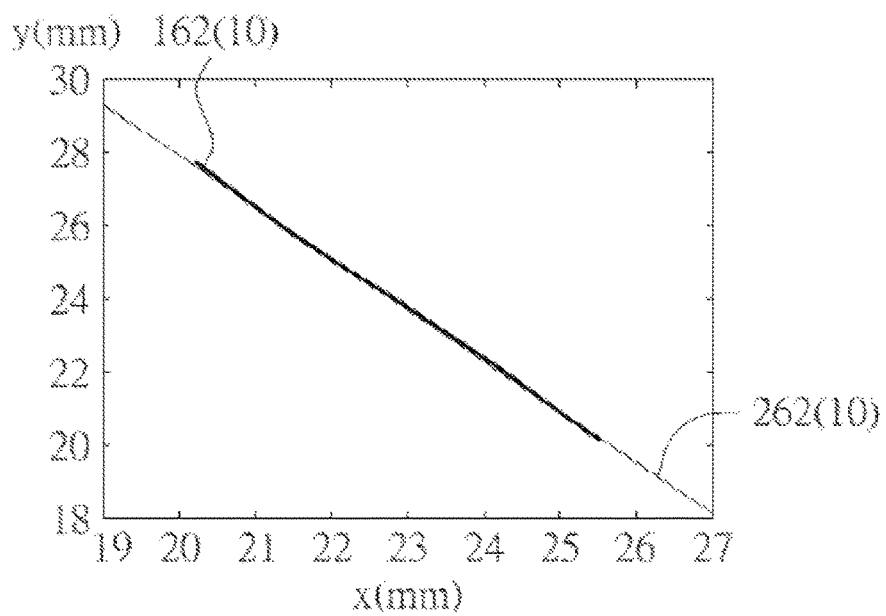
FIG. 27 is a schematic diagram of the predetermined focal surface when the angle θ is 10 degrees.
Figure 28:
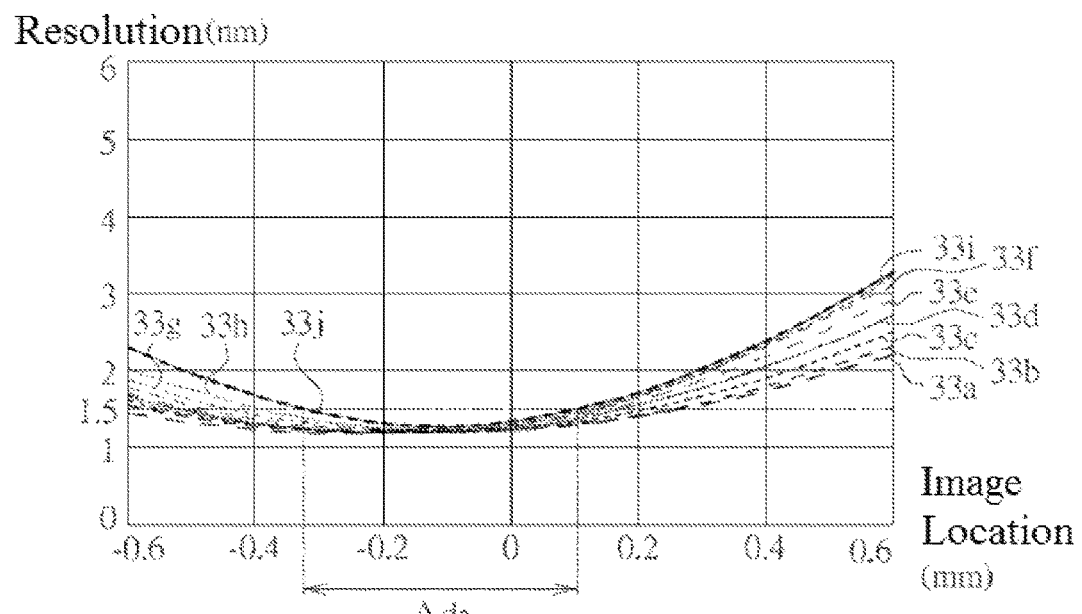
FIG. 28 is a schematic diagram of resolutions and corresponding image locations when the angle θ is 10 degrees.

With reference to FIGS. 22, 26, 27 and 28, FIG. 26 is an exemplary diagram of predetermined image and the predetermined profile surface 10 degrees angle θ. FIG. 27 is an exemplary diagram of a predetermined focal surface with 10 degrees angle θ, and FIG. 28 is an exemplary diagram of resolutions and corresponding image locations with 10 degrees angle θ. In FIG. 27, the origin of the grid represents the location of the central point P0, and the angle θ is 10 degrees. As previous described, the predetermined image 162(10) generates the predetermined profile surface 142 (10), and the predetermined focal surface 262(10) can be calculated from the predetermined profile surface 142(10) using the grating equation.

In FIG. 28, image location being 0 means the location of the predetermined focal surface 262(10), the greater value of the image location means the image location is more far away from the predetermined profile surface 142(10). On the contrary, the less value of the image location means the image location is close to the predetermined profile surface 142(10). The reflected spectral component $L(\lambda)$ from the predetermined profile surface 142(10) with different image locations may have different resolutions.

For example, if the reflected spectrum through the predetermined profile surface 142(10) are 380, 430, 480, 530, 580, 630, 680, 730 and 780 nm, the respect resolutions shown as curves 33a-33i in FIG. 28. Curve 33j has largest resolution of each of image locations. When the desired resolution is given as 1.5 nm, a corresponding depth of field (DOF) d1 can be found in curve 33j. It means when the optical sensor placed within the DOF Δd2, the resolution can be less than the 1.5 nm. If the DOF Δd2 is too narrow, configuring another predetermined image by adjusting its angle θ.

Figure 29:
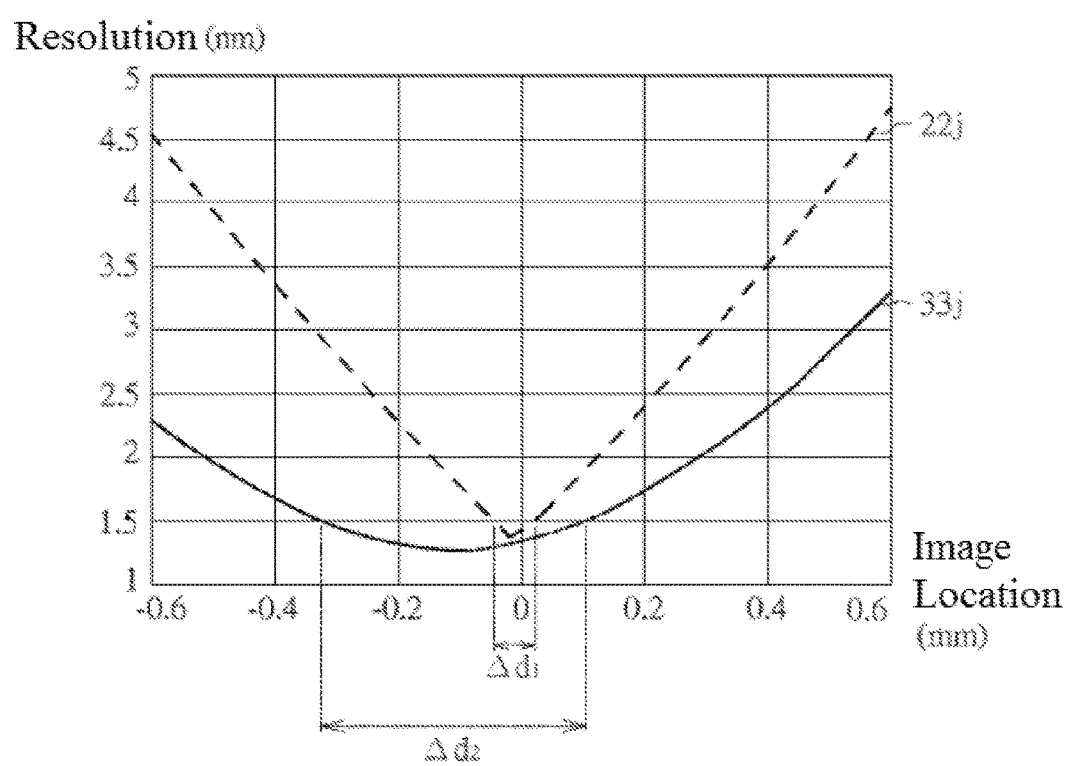
FIG. 29 is a schematic diagram showing curves 22j and 33j.

With reference to FIG. 29, FIG. 29 is an exemplary diagram of curves 22j and 33j. As shown in FIG. 29, when the desired resolution is given as 1.5 nm, the DOF Δd2 of predetermined profile surface 142(10) larger than the DOF Δd1 of predetermined profile surface 142(0). It means the optical sensor is more easier to located with the DOF Δd2, which makes easier for the resolution to be less than the 1.5 nm.

Figure 30:
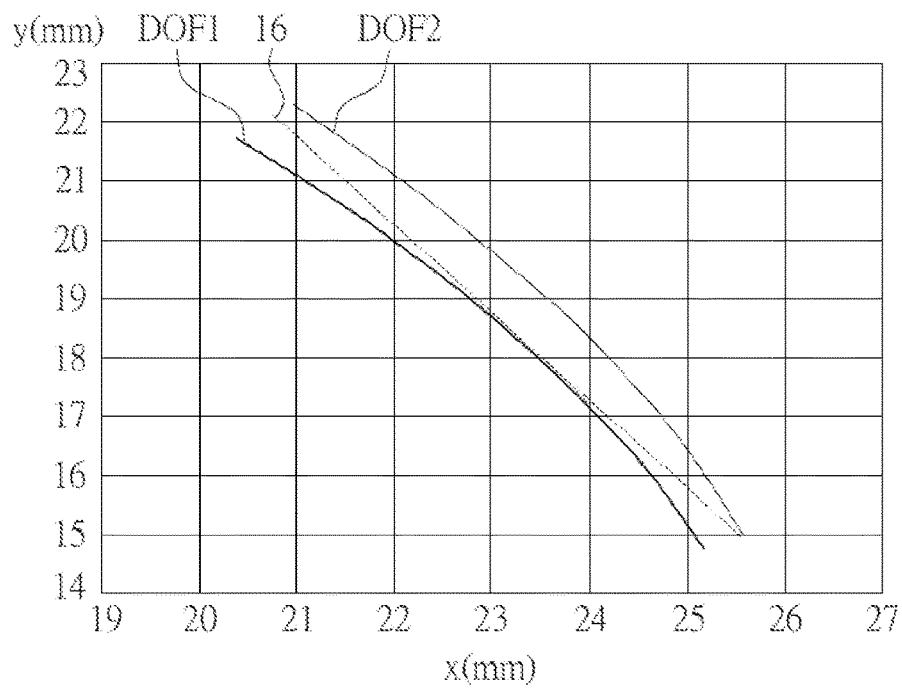
FIG. 30 is a schematic diagram of the shallow DOF and deep DOF when the angle θ is 0.

With reference to FIGS. 27, 29 and 30. FIG. 30 is an exemplary diagram of the shallow DOF and deep DOF with 0 degrees angle θ. The shallow and deep DOFs can be found in DOF Δd1 of the predetermined focal surface 262(0). The shallow DOF1 will closer to the origin than the deep DOF2. When the DOF Δd1 is too narrow, the placement of the optical sensor 230 may beyond the location of the shallow DOF1 or the deep DOF2, which failed to meet the desired resolution.

Figure 31:
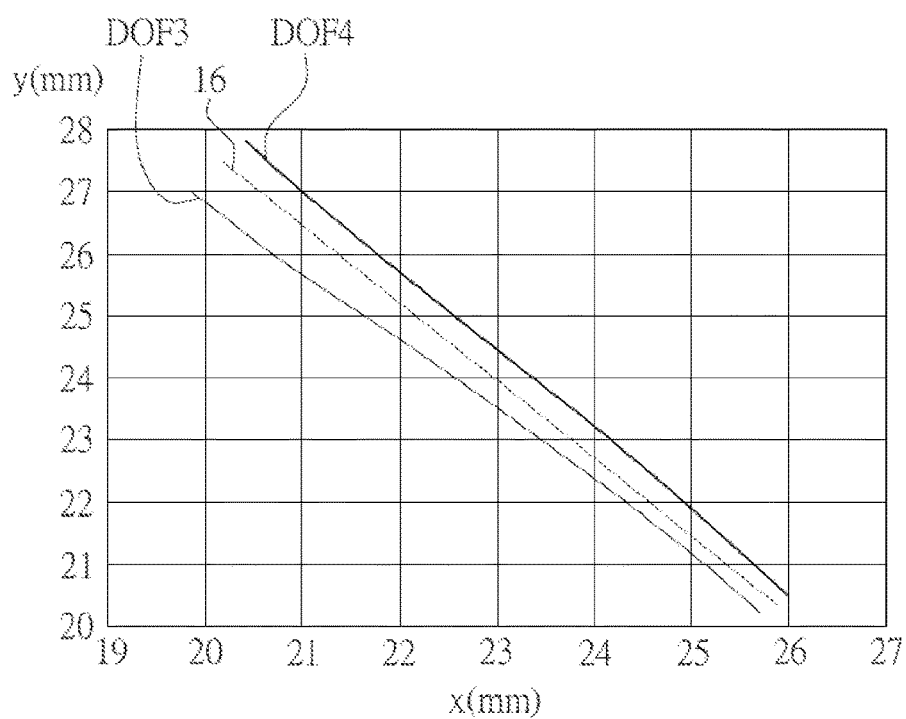
FIG. 31 is a schematic diagram of the shallow DOF and deep DOF when the angle θ is 10 degrees.

With reference to FIGS. 27, 29 and 31. FIG. 31 is an exemplary diagram of the shallow DOF and deep DOF with 10 degrees angle θ. The shallow and deep DOFs can be found in DOF Δd2 of the predetermined focal surface 262(10). The shallow DOF3 will closer to the origin than the deep DOF4. Because the DOF Δd2 is larger than the DOF Δd1, the placement of the optical sensor 230 is not easy to placed beyond the shallow DOF3 or deep DOF2, which is easier to meet the desired resolution.

Moreover, it is noted that the diffraction grating can be designed by another means except the abovementioned design. For example, the diffraction grating can be designed by the means about optical path equation described in US patent US20110080584. Thus, the diffraction grating in the present disclosure is not limited to the previous designing method.

Accordingly, in a embodiment of the present disclosure, the diffraction grating implemented using the diffraction structures arranged along the inner concave surface and a plurality of inflection points of reference curves, which is capable of not only diffraction and focusing, but also converging the spectrum onto a flat focal surface. Moreover the diffraction structures has different pitch for changing the shape of the focal surface that satisfies different optical receiving surfaces of different optical sensors.

While the disclosure has been described in connection with a number of embodiments and implementations, the disclosure is not so limited but covers various obvious modifications and equivalent arrangements, which fall within the purview of the appended claims. Although features of the disclosure are expressed in certain combinations among the claims, it is contemplated that these features can be arranged in any combination and order.

What is claimed is:

1. A method of manufacturing a diffraction grating comprising:
   providing a substrate, wherein the substrate has a concave cylindrical surface;
   using a blade to rule the concave cylindrical surface;
   determining an included angle between the directional face of the blade and the concave cylindrical surface before ruling; and
   ruling a plurality of grooves and a plurality of diffraction structures one by one on the concave cylindrical surface of the substrate along a generatrix of the concave cylindrical surface based on the determined included angle to form a reference curve having a plurality of first inflection points, wherein a section contour is obtained by a cross section of the plurality of diffraction structures; the cross section is perpendicular to the generatrix of the concave cylindrical surface; and the section contour shows a connecting line of apexes of the plurality of diffraction structures as the reference curve.

2. The method as claimed in claim 1, wherein the concave cylindrical surface is a fourth degree or higher polynomial curve.

3. The method as claimed in claim 1, wherein the concave cylindrical surface has at least one second inflection point.

4. The method as claimed in claim 1, wherein the concave cylindrical surface has no inflection point.

5. The method as claimed in claim 1, wherein the shape of each diffraction structure is a prism, and the apex of each diffraction structure is a lateral edge.

6. The method as claimed in claim 5, wherein the shape of each diffraction structure is a triangular prism.

7. The method as claimed in claim 1, wherein ruling the concave cylindrical surface with a blade performs the following steps (1) and (2) repeatedly:
   (1), moving the blade for a distance along a path, wherein the path is not parallel to the generatrix; and
   (2), ruling the concave cylindrical surface to form a groove with the blade after the blade moved for the distance along the path.

8. The method as claimed in claim 7, wherein the angle has a bisector plane, and a plurality of bisector planes is formed during ruling the concave cylindrical surface, wherein the bisector planes are parallel to each other.

9. The method as claimed in claim 7, wherein forming the diffraction structures further comprises tiling the blade along a reference axis which is parallel to the generatrix, ruling the concave cylindrical surface after tiling the blade.

10. The method as claimed in claim 9, wherein the angle has a bisector plane, and a plurality of bisector planes is formed during ruling the concave cylindrical surface, wherein at least two bisector planes are not parallel to each other.

11. The method as claimed in claim 9, wherein the angle has a bisector plane, and a plurality of bisector planes is formed during ruling the concave cylindrical surface, wherein at least three bisector planes are not parallel to each other.

12. The method as claimed in claim 7, wherein at least two distances of moving the blade twice are different.

13. The method as claimed in claim 7, wherein the distances of moving the blade are the same.

14. The method as claimed in claim 7, wherein each distance of moving the blade is smaller than the thickness of the blade.

15. The method as claimed in claim 7, wherein at least two depths ruled in the concave cylindrical surface are different from each other.

16. The method as claimed in claim 7, wherein the depths ruled in the concave cylindrical surface are the same.

17. The method as claimed in claim 1, wherein the diffraction structures have different pitches.

18. A diffraction grating made by the method as claimed in claim 1, comprising:
 a substrate; and
 a plurality of connected diffraction structures formed on the substrate, each diffraction structure being in the shape of a column and arranged along a concave cylindrical surface, and an axis of each diffraction structure extending along a generatrix of the concave cylindrical surface, a section contour is obtained by a cross section of the diffraction structures; the cross section is perpendicular to each axis of the diffraction structure; and the section contour shows the connecting line of apexes of the diffraction structures as a reference curve having a plurality of first inflection points, wherein the diffraction structures are configured for separating the optical signal into a plurality of spectral components and focusing the spectral components onto a focal surface;
 wherein the diffraction structures form a plurality of grooves, and each of the grooves is formed between two adjacent diffraction structures;
 wherein the bottoms of the grooves form a plurality of bottom angles and a plurality of bisector planes of the bottom angles;
 wherein the bisector planes of at least two bottom angles are not parallel to each other, and each of the bottom angles of the grooves is equal to the angle of the blade.

19. The diffraction grating as claimed in claim 18, wherein the concave cylindrical surface is a fourth degree or higher polynomial curve.

20. A monochromator comprising the diffraction grating as claimed in claim 18, and further comprising:
 an input member configured for receiving an optical signal; and
 a rotating mechanism connected to the diffraction grating and configured for rotating the diffraction grating along a rotating axis corresponding to the input member, wherein the rotating axis is parallel to the axes of the diffraction structures having a plurality of diffraction structures separating the optical signal into a plurality of spectral components.

21. A method of manufacturing a mold for replicating a diffraction grating, the method comprising:
 providing a mold substrate, wherein the mold substrate has a convex cylindrical surface; and
 using a blade to rule the convex cylindrical surface, wherein the blade has a directional face;
 determining an included angle between the directional face of the blade and the concave cylindrical surface before ruling; and
 ruling a plurality of grooves and a plurality of column structures one by one on the concave cylindrical surface of the substrate along a generatrix of the concave cylindrical surface based on the determined included angle to form a reference curve having a plurality of first inflection points, wherein the column structures is configured for creating a plurality of diffraction structures of the diffraction grating, a section contour is obtained by a cross section of the plurality of column structures; the cross section is perpendicular to the generatrix of the concave cylindrical surface; and the section contour shows a connecting line of apexes of the plurality of column structures as the reference curve.

22. A diffraction grating made by the mold as recited in claim 21, comprising:
 a substrate; and
 a plurality of connected diffraction structures formed on the substrate, each diffraction structure being in the shape of a column and arranged along a concave cylindrical surface, and an axis of each diffraction structure extending along a generatrix of the concave cylindrical surface, a section contour is obtained by a cross section of the diffraction structures; the cross section is perpendicular to each axis of the diffraction structure; and the section contour shows the connecting line of apexes of the diffraction structures as a reference curve having a plurality of first inflection points, wherein the diffraction structures are configured for separating the optical signal into a plurality of spectral components and focusing the spectral components onto a focal surface;
 wherein the diffraction structures form a plurality of grooves, and each of the grooves is formed between two adjacent diffraction structures;
 wherein the bottoms of the grooves form a plurality of bottom angles and a plurality of bisector planes of the bottom angles;
 wherein the bisector planes of at least two bottom angles are not parallel to each other.

* * * * *